(12) United States Patent
Usukura et al.

(10) Patent No.: US 11,852,952 B2
(45) Date of Patent: Dec. 26, 2023

(54) LIQUID CRYSTAL LENS, HEAD MOUNTED DISPLAY AND POLARIZED SUNGLASSES

(71) Applicant: Sharp Display Technology Corporation, Kameyama (JP)

(72) Inventors: Naru Usukura, Kameyama (JP); Hiroaki Asagi, Kameyama (JP); Yasuhiro Haseba, Kameyama (JP); Kiyoshi Minoura, Kameyama (JP)

(73) Assignee: SHARP DISPLAY TECHNOLOGY CORPORATION, Kameyama (JP)

( * ) Notice: Subject to any disclaimer, the term of this patent is extended or adjusted under 35 U.S.C. 154(b) by 0 days.

(21) Appl. No.: 17/969,839

(22) Filed: Oct. 20, 2022

(65) Prior Publication Data

US 2023/0134662 A1 May 4, 2023

(30) Foreign Application Priority Data

Oct. 27, 2021 (JP) .................................. 2021-175563
Jul. 8, 2022 (JP) .................................. 2022-110534

(51) Int. Cl.
*G02F 1/29* (2006.01)
*G06F 1/16* (2006.01)
(Continued)

(52) U.S. Cl.
CPC .............. *G02F 1/294* (2021.01); *G06F 1/163* (2013.01); *G02C 7/083* (2013.01); *G02C 7/10* (2013.01);
(Continued)

(58) Field of Classification Search
None
See application file for complete search history.

(56) References Cited

U.S. PATENT DOCUMENTS 5,097,352 A * 3/1992 Takahashi .............. G02B 27/28
349/200
5,150,234 A * 9/1992 Takahashi ................ G02F 1/29
349/1

(Continued)

FOREIGN PATENT DOCUMENTS

JP 2009-098641 * 5/2009
JP 2009-098641 A 5/2009

(Continued)

*Primary Examiner* — Ryan Crockett
(74) *Attorney, Agent, or Firm* — KEATING & BENNETT, LLP

(57) ABSTRACT

Provided is a liquid crystal lens including: a first substrate; a second substrate facing the first substrate; and a liquid crystal layer held between the first substrate and the second substrate and containing liquid crystal molecules. The first substrate includes a Fresnel lens and a first electrode sequentially toward the liquid crystal layer. The second substrate includes a second electrode. The Fresnel lens includes a Fresnel-shaped part including annular lens surfaces in a concentric circle pattern and a flat part including a flat surface that extends in a radial direction of the concentric circle and intersects at least one of the annular lens surfaces. The annular lens surfaces are on a liquid crystal layer-facing surface of the Fresnel-shaped part and defines an uneven surface. The flat surface is on the liquid crystal layer-facing surface of the flat part.

22 Claims, 18 Drawing Sheets

(51) Int. Cl.
 *G02C 7/10* (2006.01)
 *G02C 7/08* (2006.01)
(52) U.S. Cl.
 CPC .... *G02C 2202/20* (2013.01); *G02F 2201/122* (2013.01); *G02F 2201/56* (2013.01)

(56) References Cited

U.S. PATENT DOCUMENTS

| | | | |
|---|---|---|---|
| 11,442,332 B1* | 9/2022 | Sprague | G02C 7/083 |
| 2005/0162591 A1* | 7/2005 | Hashimoto | G02F 1/133553 |
| | | | 349/113 |
| 2007/0127348 A1* | 6/2007 | Ooi | G11B 7/1369 |
| | | | 369/112.02 |
| 2013/0107186 A1* | 5/2013 | Ando | G02C 7/083 |
| | | | 349/153 |
| 2016/0018702 A1* | 1/2016 | Lee | G02F 1/133788 |
| | | | 349/123 |
| 2019/0219856 A1* | 7/2019 | Mizusaki | C09K 19/30 |
| 2020/0033694 A1* | 1/2020 | Gao | G02F 1/29 |
| 2021/0026159 A1* | 1/2021 | Muramatsu | B29D 11/00807 |
| 2021/0072438 A1* | 3/2021 | Marchal | G02C 7/083 |

FOREIGN PATENT DOCUMENTS

| | | | |
|---|---|---|---|
| JP | 2009-098644 A | 5/2009 | |
| JP | 5698328 B2 | 4/2015 | |

\* cited by examiner

LIQUID CRYSTAL LENS, HEAD MOUNTED DISPLAY AND POLARIZED SUNGLASSES

CROSS-REFERENCE TO RELATED APPLICATIONS

The present application claims priority under 35 U.S.C. § 119 to Japanese Patent Application No. 2021-175563 filed on Oct. 27, 2021 and Japanese Patent Application No. 2022-110534 filed on Jul. 8, 2022, the contents of which are incorporated herein by reference in their entirety.

BACKGROUND OF THE INVENTION

Field of the Invention

The following disclosure relates to liquid crystal lenses, head mounted displays, and polarized sunglasses.

Description of Related Art

Liquid crystal Fresnel lenses are varifocal lenses including a Fresnel lens on a flat or curved transparent substrate and a liquid crystal material filled along the shape of the Fresnel lens. The focal length of a liquid crystal Fresnel lens is varied by applying voltage to both sides of the portion filled with a liquid crystal material and thus varying the refractive index of the liquid crystal material. A liquid crystal Fresnel lens is also simply referred to as a liquid crystal lens hereinbelow.

JP 2009-98641 A, for example, discloses as a liquid crystal lens a liquid crystal Fresnel lens including: a first transparent substrate having a Fresnel lens on one of its surfaces and a first transparent electrode disposed on the Fresnel lens surface, wherein each circle of the Fresnel lens is provided with at least one notch in its ridge line; a second transparent substrate having a second transparent electrode on one of its surfaces; and liquid crystals between the first transparent substrate and the second transparent substrate, with the second transparent electrode on the second transparent substrate facing the Fresnel lens on the first transparent substrate.

JP 2009-98644 A discloses a liquid crystal Fresnel lens including a first transparent substrate having a Fresnel lens on one of its surfaces; a first transparent electrode formed only on the lens surfaces of the Fresnel lens; a second transparent substrate having a second transparent electrode on one of its surfaces, with the surface having the second transparent electrode formed thereon facing the first transparent electrode; and liquid crystals between the first transparent substrate and the second transparent substrate.

JP 5698328 B discloses a liquid crystal lens including a first substrate having a lens structure, a second substrate paired with the first substrate, and a liquid crystal layer between the lens structure and the second substrate, wherein the pre-tilt angle provided by an alignment treatment layer on the liquid crystal layer side of the second substrate is greater than the pre-tilt angle provided by an alignment treatment layer on the liquid crystal layer side of the lens structure.

BRIEF SUMMARY OF THE INVENTION

FIG. 26 is a schematic cross-sectional view of a conventional liquid crystal lens. FIG. 27 is a schematic cross-sectional view of the conventional liquid crystal lens with no voltage applied. FIG. 28 is a schematic cross-sectional view of the conventional liquid crystal lens with voltage applied. As shown in FIG. 26 to FIG. 28, a conventional liquid crystal lens 10R includes a first substrate 100, a second substrate 200 facing the first substrate 100, and a liquid crystal layer 300 sealed between the first substrate 100 and the second substrate 200 with a sealant 400 and containing liquid crystal molecules 310. The first substrate 100 includes, sequentially toward the liquid crystal layer 300, a first support substrate 110, a Fresnel lens 120, and a first electrode 130. The second substrate 200 includes, sequentially toward the liquid crystal layer 300, a second support substrate 210 and a second electrode 220. Commonly known liquid crystal lenses have this structure of the liquid crystal lens 10R in which the Fresnel lens 120 is disposed on one of the two substrates (first substrate 100 and second substrate 200) and is sandwiched between the support substrates.

The liquid crystal molecules 310 have an anisotropic refractive index. In the liquid crystal lens 10R, the voltage applied between the first electrode 130 and the second electrode 220 is varied to control the alignment of the liquid crystal molecules 310, so that the refractive index of the liquid crystal layer 300 for incident light can be varied between the extraordinary refractive index (ne) and the ordinary refractive index (no). The refractive indices satisfy the relationship ne>no. The conventional liquid crystal lens 10R which is based on these principles basically can turn on or off the lens functions for only one of s-polarized light and p-polarized light.

There may be various designs for the refractive index and the anisotropy of dielectric constant of the liquid crystal molecules 310. For example, the ordinary refractive index no of positive liquid crystal molecules having a positive anisotropy of dielectric constant may be made substantially the same as the refractive index of the resin constituting the Fresnel lens 120. In this case, with no voltage applied between the first electrode 130 and the second electrode 220, the liquid crystal layer 300 experiences the extraordinary refractive index ne. This, as shown in FIG. 27, makes a difference in refractive index for polarized light 11L between the Fresnel lens 120 and the liquid crystal layer 300, thus allowing the liquid crystal lens 10R to function as a lens.

Meanwhile, with voltage applied between the first electrode 130 and the second electrode 220, the liquid crystal layer 300 experiences the ordinary refractive index no. This, as shown in FIG. 28, makes no difference in refractive index for the polarized light 11L between the Fresnel lens 120 and the liquid crystal layer 300, thus failing to allow the liquid crystal lens 10R to function as a lens.

As shown in FIG. 26 to FIG. 28, the surface of the Fresnel lens 120 is not flat but is uneven with steps whose vertex angle is sharp. The first electrode 130 may be open-circuited on such steps.

None of JP 2009-98641 A, JP 2009-98644 A, and JP 5698328 B mentions sufficient studies on liquid crystal lenses capable of reducing or preventing occurrence of an open circuit, and thus there is room for improvement.

In response to the above issues, an object of the present invention is to provide a liquid crystal lens capable of reducing or preventing occurrence of an open circuit, a head mounted display including the liquid crystal lens, and polarized sunglasses including the liquid crystal lens.

(1) One embodiment of the present invention is directed to a liquid crystal lens including: a first substrate; a second substrate facing the first substrate; and a liquid crystal layer held between the first substrate and the second substrate and containing liquid crystal molecules, the first substrate including a Fresnel lens and a first electrode sequentially toward the liquid crystal layer, the second substrate including a second electrode, the Fresnel lens including a Fresnel-shaped part and a flat part, the Fresnel-shaped part including a plurality of annular lens surfaces disposed in a concentric circle pattern, the flat part including a flat surface that extends in a radial direction of the concentric circle and intersects at least one of the annular lens surfaces, the annular lens surfaces disposed on a liquid crystal layer-facing surface of the Fresnel-shaped part and defining an uneven surface, the flat surface disposed on a liquid crystal layer-facing surface of the flat part.

(2) In an embodiment of the present invention, the liquid crystal lens includes the structure (1), and the first electrode overlaps the flat surface.

(3) In an embodiment of the present invention, the liquid crystal lens includes the structure (1) or (2), and the flat surface in a plan view extends linearly from an outermost periphery of the Fresnel lens toward a center of the Fresnel lens.

(4) In an embodiment of the present invention, the liquid crystal lens includes the structure (1), (2), or (3), and the flat surface is disposed at the same height as a vertex of the uneven surface or higher than the vertex of the uneven surface.

(5) In an embodiment of the present invention, the liquid crystal lens further includes a spacer as well as the structure (1), (2), (3), or (4), and the spacer overlaps the flat surface.

(6) In an embodiment of the present invention, the liquid crystal lens includes the structure (1), (2), (3), (4), or (5), and the second substrate further includes, in a liquid crystal layer-facing surface of the second substrate, a tapered portion that is thick in its center and becomes thinner toward its periphery.

(7) In an embodiment of the present invention, the liquid crystal lens includes the structure (6), and the tapered portion in a plan view is rotationally symmetric.

(8) In an embodiment of the present invention, the liquid crystal lens includes the structure (6), and the tapered portion in a plan view is symmetric about a line at an initial alignment azimuth of the liquid crystal molecules.

(9) In an embodiment of the present invention, the liquid crystal lens includes the structure (1), (2), (3), (4), (5), (6), (7), or (8), and further includes, on a liquid crystal layer side of the Fresnel lens, an alignment maintenance layer configured to control alignment of the liquid crystal molecules.

(10) In an embodiment of the present invention, the liquid crystal lens includes the structure (1), (2), (3), (4), (5), (6), (7), (8), or (9), and the Fresnel lens is provided, in a liquid crystal layer-facing surface of the Fresnel lens, with a plurality of grooves parallel to one another.

(11) In an embodiment of the present invention, the liquid crystal lens includes the structure (1), (2), (3), (4), (5), (6), (7), (8), (9), or (10), and further includes an alignment film between the second substrate and the liquid crystal layer, wherein the alignment film contains a polymer having a cyclic aliphatic group.

(12) In an embodiment of the present invention, the liquid crystal lens includes the structure (1), (2), (3), (4), (5), (6), (7), (8), (9), (10), or (11), and the liquid crystal layer has a birefringence $\Delta n$ of 0.2 or higher.

(13) In an embodiment of the present invention, the liquid crystal lens includes the structure (1), (2), (3), (4), (5), (6), (7), (8), (9), (10), (11), or (12), and the liquid crystal layer has a nematic-isotropic phase transition temperature of 110° C. or higher.

(14) In an embodiment of the present invention, the liquid crystal lens includes the structure (1), (2), (3), (4), (5), (6), (7), (8), (9), (10), (11), (12), or (13), and the liquid crystal molecules have a tolane structure.

(15) In an embodiment of the present invention, the liquid crystal lens includes the structure (1), (2), (3), (4), (5), (6), (7), (8), (9), (10), (11), (12), (13), or (14), the liquid crystal molecules have a positive anisotropy of dielectric constant, and the liquid crystal molecules have an ordinary refractive index equal to a refractive index of the Fresnel lens.

(16) In an embodiment of the present invention, the liquid crystal lens includes the structure (1), (2), (3), (4), (5), (6), (7), (8), (9), (10), (11), (12), (13), (14), or (15), and light incident on the liquid crystal lens is linearly polarized light vibrating at an azimuth parallel to an initial alignment azimuth of the liquid crystal molecules.

(17) In an embodiment of the present invention, the liquid crystal lens includes the structure (1), (2), (3), (4), (5), (6), (7), (8), (9), (10), (11), (12), (13), (14), (15), or (16), and at least one of the first electrode or the second electrode is a stack of a plurality of films having different refractive indices.

(18) In an embodiment of the present invention, the liquid crystal lens includes the structure (17), and the stack includes a transparent conductive film and at least one type of an inorganic film.

(19) In an embodiment of the present invention, the liquid crystal lens includes the structure (1), (2), (3), (4), (5), (6), (7), (8), (9), (10), (11), (12), (13), (14), (15), (16), (17), or (18), the liquid crystal layer is a first liquid crystal layer, the liquid crystal molecules are first liquid crystal molecules, the Fresnel lens is a first Fresnel lens, the annular lens surfaces are first annular lens surfaces, the Fresnel-shaped part is a first Fresnel-shaped part, the concentric circle pattern is a first concentric circle pattern, the flat surface is a first flat surface, and the flat part is a first flat part, the liquid crystal lens further includes a third substrate facing the first liquid crystal layer across the second substrate or facing the first liquid crystal layer across the first substrate; a fourth substrate facing the third substrate; and a second liquid crystal layer held between the third substrate and the fourth substrate and containing second liquid crystal molecules, the third substrate including a second Fresnel lens and a third electrode sequentially toward the second liquid crystal layer, the fourth substrate including a fourth electrode, the second Fresnel lens including a second Fresnel-shaped part and a second flat part, the second Fresnel-shaped part including a plurality of second annular lens surfaces disposed in a second concentric circle pattern, the second flat part including a second flat surface that extends in a radial direction of the second concentric circle and intersects at least one of the second annular lens surfaces, the second annular lens surfaces disposed on a second liquid crystal layer-facing surface of the second Fresnel-shaped part and defining an uneven surface, the second flat surface disposed on a second liquid crystal layer-facing surface of the second flat part.

(20) In an embodiment of the present invention, the liquid crystal lens includes the structure (19), and an alignment direction of the first liquid crystal molecules and an alignment direction of the second liquid crystal molecules are the same as each other or inverted from each other.

(21) In an embodiment of the present invention, the liquid crystal lens includes the structure (19), and an alignment direction of the first liquid crystal molecules and an alignment direction of the second liquid crystal molecules are perpendicular to each other.

(22) In an embodiment of the present invention, the liquid crystal lens includes the structure (1), (2), (3), (4), (5), (6), (7), (8), (9), (10), (11), (12), (13), (14), (15), (16), (17), (18), (19), (20), or (21), and further includes a first alignment film between the first substrate and the liquid crystal layer, and a second alignment film between the second substrate and the liquid crystal layer, wherein the first alignment film is a photoalignment film and the second alignment film is s rubbed alignment film.

(23) In an embodiment of the present invention, the liquid crystal lens includes the structure (1), (2), (3), (4), (5), (6), (7), (8), (9), (10), (11), (12), (13), (14), (15), (16), (17), (18), (19), (20), or (21), and further includes a first alignment film between the first substrate and the liquid crystal layer, a second alignment film between the second substrate and the liquid crystal layer, and a spacer disposed on a liquid crystal layer side of the second substrate, wherein the second alignment film is a photoalignment film.

(24) In an embodiment of the present invention, the liquid crystal lens includes the structure (1), (2), (3), (4), (5), (6), (7), (8), (9), (10), (11), (12), (13), (14), (15), (16), (17), (18), (19), (20), or (21), and further includes a first alignment film between the first substrate and the liquid crystal layer, a second alignment film between the second substrate and the liquid crystal layer, and a spacer disposed on a liquid crystal layer side of the first substrate, wherein the first alignment film is a photoalignment film.

(25) Another embodiment of the present invention is directed to a head mounted display including the liquid crystal lens having any one of the structures (1), (2), (3), (4), (5), (6), (7), (8), (9), (10), (11), (12), (13), (14), (15), (16), (17), (18), (19), (20), (21), (22), (23), and (24).

(26) Yet another embodiment of the present invention is directed to polarized sunglasses including the liquid crystal lens having any one of the structures (1), (2), (3), (4), (5), (6), (7), (8), (9), (10), (11), (12), (13), (14), (15), (16), (17), (18), (19), (20), (21), (22), (23), and (24).

The present invention can provide a liquid crystal lens capable of reducing or preventing occurrence of an open circuit, a head mounted display including the liquid crystal lens, and polarized sunglasses including the liquid crystal lens.

DETAILED DESCRIPTION OF THE INVENTION

The present invention is described in more detail based on the following embodiments with reference to the drawings. The present invention is not limited to the embodiments.

Embodiment 1

Figure 1:
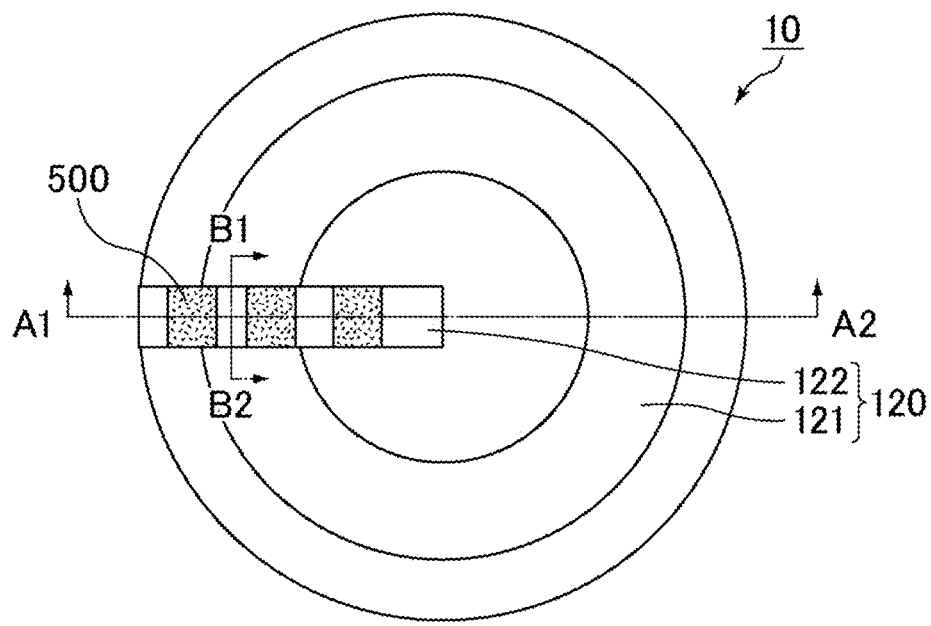
FIG. 1 is a schematic plan view of a liquid crystal lens of Embodiment 1.
Figure 2A:
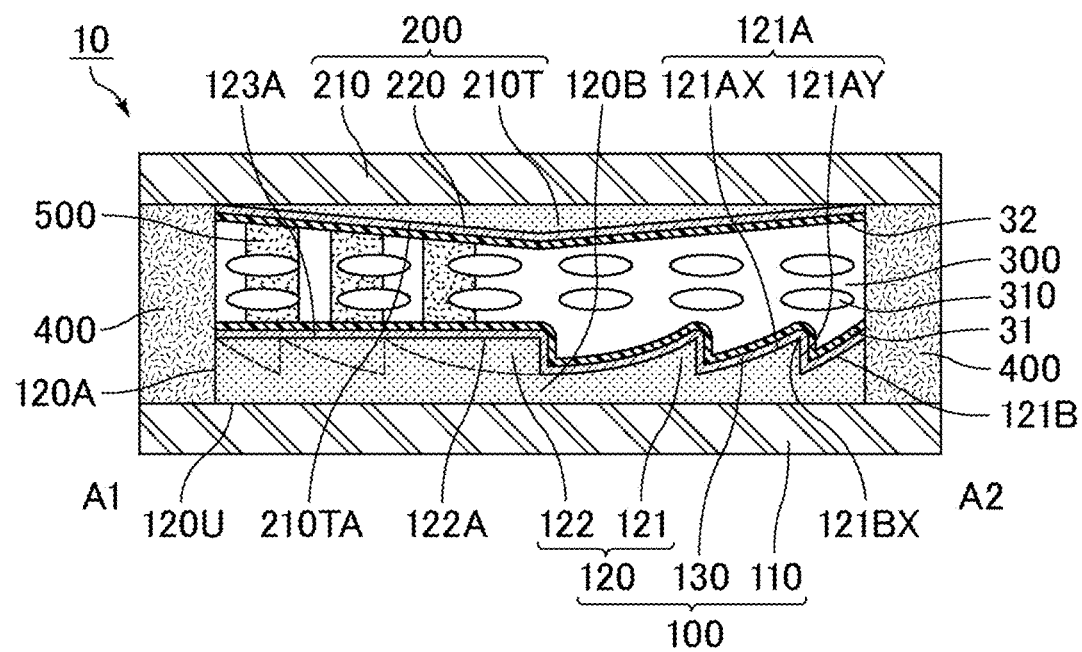
FIG. 2A is a schematic cross-sectional view of the liquid crystal lens of Embodiment 1 taken along line A1-A2 in FIG. 1.

FIG. 1 is a schematic plan view of a liquid crystal lens of Embodiment 1. FIG. 2A is a schematic cross-sectional view of the liquid crystal lens of Embodiment 1 taken along line A1-A2 in FIG. 1. As shown in FIG. 1 and FIG. 2A, a liquid crystal lens 10 of the present embodiment includes a first substrate 100; a second substrate 200 facing the first substrate 100; a liquid crystal layer 300 held between the first substrate 100 and the second substrate 200 and containing liquid crystal molecules 310. The first substrate 100 includes a Fresnel lens 120 and a first electrode 130 sequentially toward the liquid crystal layer 300. The second substrate 200 includes a second electrode 220. This configuration can vary the focal length of the liquid crystal lens 10 by varying the voltage applied between the first electrode 130 and the second electrode 220 and thus varying the refractive index of the liquid crystal layer 300. The liquid crystal lens 10 of the present embodiment is a varifocal lens.

The Fresnel lens 120 includes a Fresnel-shaped part 121 and a flat part 122. The Fresnel-shaped part 121 includes a plurality of annular lens surfaces 121A disposed in a concentric circle pattern. The flat part 122 includes a flat surface 122A that extends in a radial direction of the concentric circle and intersects at least one of the annular lens surfaces 121A. The annular lens surfaces 121A are disposed on the liquid crystal layer 300-facing surface of the Fresnel-shaped part 121 and define an uneven surface 121B. The flat surface 122A is disposed on the liquid crystal layer 300-facing surface of the flat part 122. When conductive lines are disposed on a conventional Fresnel lens, the conductive lines are on the uneven surface of the Fresnel lens, meaning that they may be rather easily open-circuited. In contrast, the present embodiment can reduce or prevent occurrence of such an open circuit since the Fresnel lens 120 has the flat surface 122A and conductive lines can be disposed to overlap the flat surface 122A.

Hereinafter, the liquid crystal lens 10 of the present embodiment is described in detail.

The liquid crystal lens 10 of the present embodiment includes, as shown in FIG. 1 and FIG. 2A, the first substrate 100, the second substrate 200 facing the first substrate 100, and the liquid crystal layer 300 sealed between the first substrate 100 and the second substrate 200 with a sealant 400 and containing the liquid crystal molecules 310. The first substrate 100 includes a first support substrate 110, the Fresnel lens 120, and the first electrode 130 sequentially toward the liquid crystal layer 300. The second substrate 200 includes a second support substrate 210 and the second electrode 220 sequentially toward the liquid crystal layer 300.

Preferably, the liquid crystal lens 10 includes an alignment film at least one of between the first substrate 100 and the liquid crystal layer 300 or between the second substrate 200 and the liquid crystal layer 300. With this configuration, the alignment of the liquid crystal molecules 310 with no voltage applied can be controlled. In the present embodiment, the mode is described where the liquid crystal lens 10 includes a first alignment film 31 between the first substrate 100 and the liquid crystal layer 300 and a second alignment film 32 between the second substrate 200 and the liquid crystal layer 300. Yet, an alignment film may be disposed only between the first substrate 100 and the liquid crystal layer 300 or only between the second substrate 200 and the liquid crystal layer 300. Such a configuration also can achieve the effect of controlling the alignment of liquid crystal molecules 310 with no voltage applied.

Preferably, the height (thickness) of the liquid crystal lens 10 is 50 μm or lower. This configuration can control the cell thickness, and thus reduce or prevent a decline in response speed of the liquid crystal molecules 310. The height of the liquid crystal lens 10 is, for example, 3 μm or higher. With a height of the liquid crystal lens 10 of lower than 3 μm, the lens may be divided into too many sections. With a height of the liquid crystal lens 10 of lower than 1 μm, the height of the liquid crystal lens 10 may be difficult to control.

The first support substrate 110 and the second support substrate 210 may be, for example, substrates such as glass substrates or plastic substrates. The glass substrates may be made of, for example, glass such as float glass or soda-lime glass. The plastic substrates may be made of, for example, a plastic such as polyethylene terephthalate, polybutylene terephthalate, polyethersulfone, polycarbonate, or alicyclic polyolefin. Preferably, the first support substrate 110 and the second support substrate 210 are transparent substrates.

The liquid crystal lens 10 of the present embodiment includes the first support substrate 110 on the surface of the Fresnel lens 120 remote from the liquid crystal layer 300. The liquid crystal lens 10, however, may not include the first support substrate 110.

The first electrode 130 and the second electrode 220 are, for example, transparent conductive films. The first electrode 130 and the second electrode 220 can be formed by, for example, forming a single- or multi-layered film of a transparent conductive material such as indium tin oxide (ITO), indium zinc oxide (IZO), zinc oxide (ZnO), or tin oxide (SnO) or an alloy of any of these materials by sputtering or any other method, and patterning the film by photolithography or any other method.

Herein, the state with no voltage applied, where the voltage applied between the first electrode 130 and the second electrode 220 is lower than the threshold voltage (including no voltage application), is also referred to simply as "with no voltage applied". The state with voltage applied, where the voltage applied between the first electrode 130 and the second electrode 220 is the threshold voltage or higher, is also referred to simply as "with voltage applied".

The Fresnel lens 120 includes the Fresnel-shaped part 121 and the flat part 122.

The Fresnel-shaped part 121 includes the annular lens surfaces 121A, each having a refractive surface 121AX and a non-refractive surface 121AY, arranged in a concentric circle pattern in regions excluding the region where the flat part 122 is arranged. The Fresnel lens 120 utilizes the refractive surfaces 121AX to refract light to change the direction that the light travels. The refractive surfaces 121AX may be arranged at the same pitch or different pitches. The annular lens surfaces 121A are arranged on the liquid crystal layer 300-facing surface of the Fresnel-shaped part 121 and define the uneven surface 121B.

The uneven surface 121B, for example, has regular steps whose height is 0.01 μm or higher and 200 μm or lower. Examples of the regular steps include steps formed at a constant pitch, steps formed at a constant height, and steps formed at a constant pitch and a constant height. The uneven surface 121B may include a non-step portion as well as the regular steps. The non-step portion is flat (smooth), for example. Specifically, the non-step portion has a ten-point mean roughness (Rzjis) as measured in conformity with JIS B 0601 of 0.2 μm or less.

The flat part 122 includes the flat surface 122A that extends in the radial direction of the concentric circle and intersects at least one of the annular lens surfaces 121A. The flat surface 122A is disposed on the liquid crystal layer 300-facing surface of the flat part 122.

Conventional Fresnel lenses have only the Fresnel-shaped part without any flat part. This means that the conventional Fresnel lenses include conductive lines on an uneven surface and thus are prone to causing open circuits.

In order to prevent occurrence of breakage of the conductive lines due to the steps on the Fresnel lens, JP 2009-98641 A mentions provision of at least one notch in the ridge line of each circle of the Fresnel lens. With the notches, however, the conductive lines are still bent sharply in some areas, and thus this measure is considered insufficient.

In contrast, the present embodiment can reduce occurrence of an open circuit (breakage due to the steps) owing to the configuration in which the conductive lines overlap the flat surface 122A. For example, in the present embodiment, preferably, the first electrode 130 overlaps the flat surface 122A. This configuration can reduce occurrence of an open circuit in the first electrode 130.

Figure 2B:
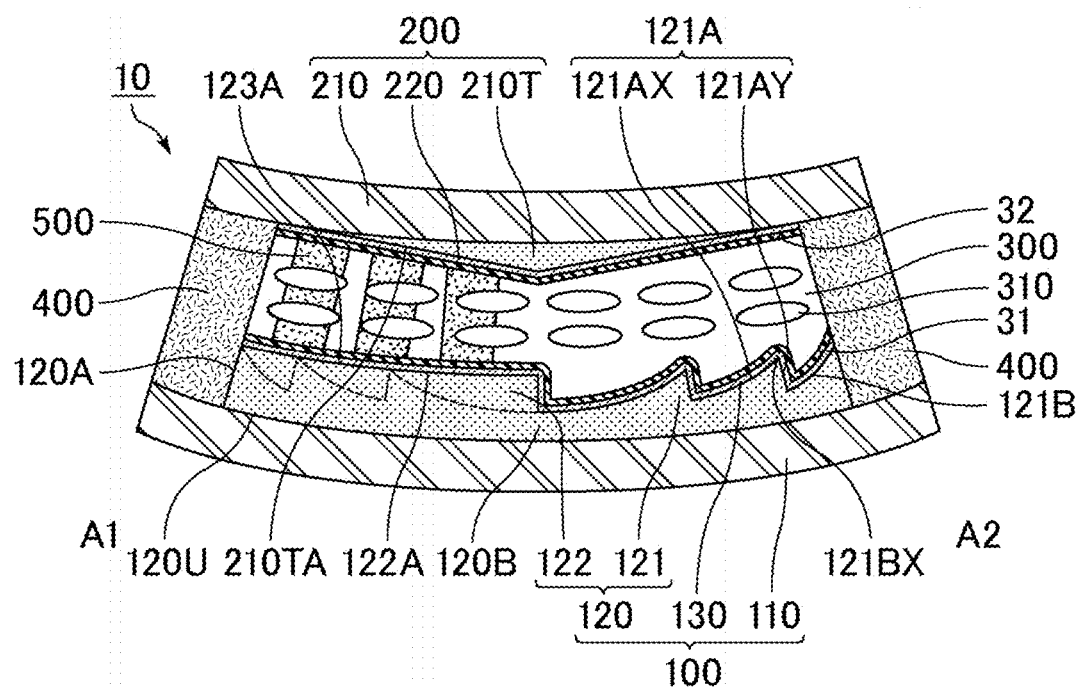
FIG. 2B is a schematic cross-sectional view of an example in which the liquid crystal lens of Embodiment 1 has a curved shape.
Figure 2C:
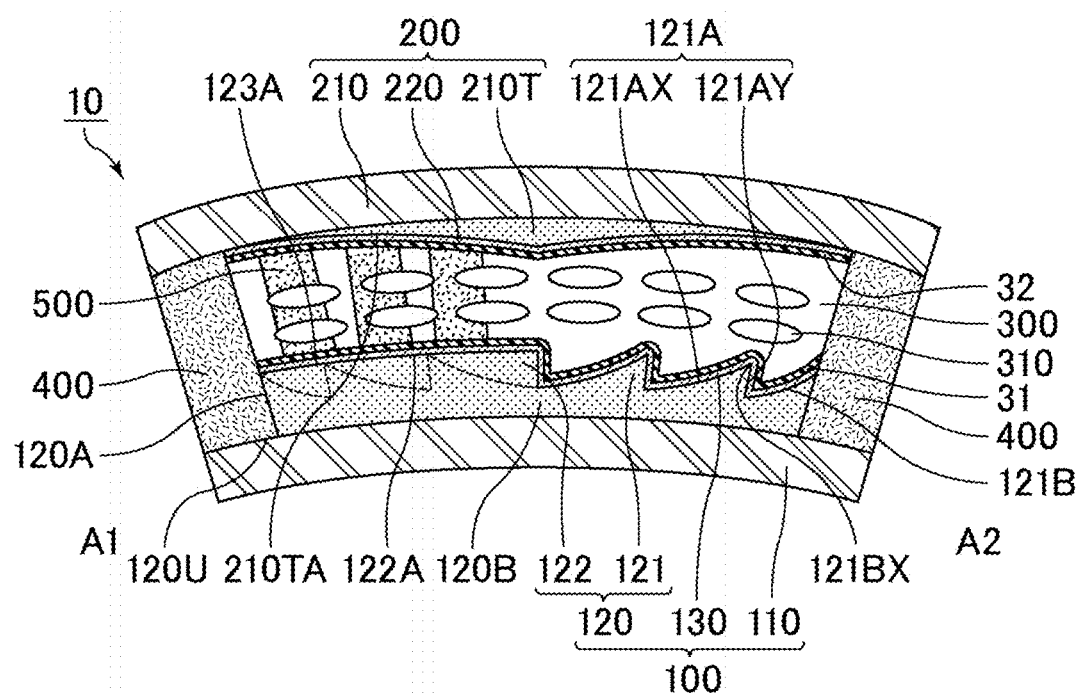
FIG. 2C is a schematic cross-sectional view of another example in which the liquid crystal lens of Embodiment 1 has a curved shape.

The flat surface 122A is smooth and has, for example, a ten-point mean roughness (Rzjis) as measured in conformity with JIS B0601 of 0.2 μm or less. The lower limit of the ten-point mean roughness (Rzjis) of the flat surface 122A is not limited and may be, for example, 0 μm or more. In the case of the liquid crystal lens 10 having a curved shape, the flat surface 122A, if smooth, may be curved following the curved shape of the liquid crystal lens 10 as shown in FIG. 2B and FIG. 2C. FIG. 2B and FIG. 2C each are a schematic cross-sectional view showing an example where the liquid crystal lens of Embodiment 1 has a curved shape.

Preferably, the flat surface 122A in a plan view extends linearly. Here, use of an imprint mold in production of the liquid crystal Fresnel lens of JP 2009-98641 A would require addition of the shapes corresponding to the notches to the mold for the Fresnel lens, which may complicate the production of the mold. In contrast, the present embodiment allows easy production of a mold for the Fresnel lens 120 owing to the flat surface 122A extending linearly in a plan view. Preferably, the flat part 122 is formed using a mold simultaneously with the Fresnel-shaped part 121 from the same material.

Preferably, the flat surface 122A in a plan view extends linearly from an outermost periphery 120A of the Fresnel lens 120 toward a center 120B of the Fresnel lens 120. In Fresnel lenses, the vertex angle of the steps of the uneven surface decreases from the center toward the outermost periphery to cause the inclination angle of the steps to be sharp, so that the electrodes on the Fresnel lens are prone to being open-circuited. However, with the flat surface 122A which in a plan view extends linearly from the outermost periphery 120A of the Fresnel lens 120 toward the center 120B of the Fresnel lens 120, the present embodiment can effectively reduce or prevent occurrence of an open circuit. The present embodiment also can prevent occurrence of an open circuit in the diametral direction of the liquid crystal lens 10.

Figure 3A:
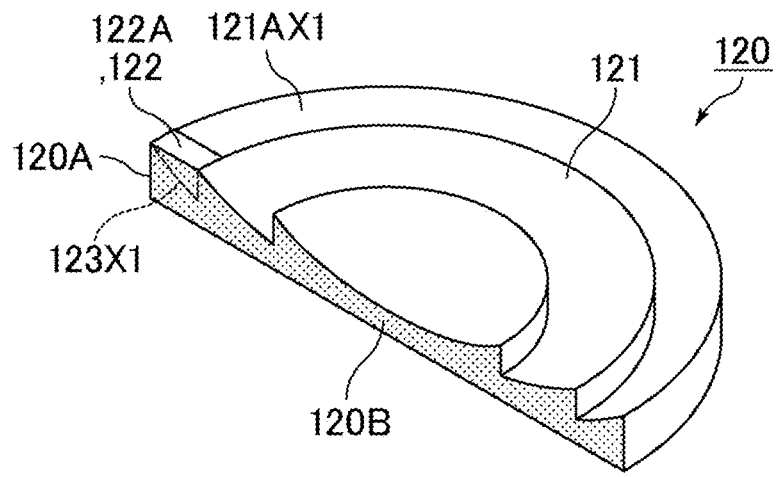
FIG. 3A is a schematic perspective view of an example of a Fresnel lens in the liquid crystal lens of Embodiment 1.

FIG. 3A is a schematic perspective view of an example of a Fresnel lens in the liquid crystal lens of Embodiment 1. Preferably, as shown in FIG. 3A, the flat surface 122A covers a region 123X1 corresponding to a refractive surface 121AX1 at the outermost periphery 120A of the Fresnel lens 120 (i.e., covers the edge including the outermost periphery 120A of the Fresnel lens 120). Herein, the region corresponding to a refractive surface of the Fresnel lens is a region overlapping a flat part in a case where the refractive surface of the Fresnel lens is extended hypothetically in a concentric circle pattern to the flat part in the structure in which the flat part constitutes part of the Fresnel lens as shown in FIG. 3A to FIG. 3F.

Since the vertex angle of the steps of the uneven surface in the Fresnel lens decreases toward the outermost periphery to cause the inclination angle of the steps to be sharp, the electrodes on the Fresnel lens are prone to being open-circuited. Yet, occurrence of an open circuit can be effectively reduced or prevented when the flat surface 122A covers the region corresponding to the refractive surface 121AX1 at the outermost periphery 120A of the Fresnel lens 120 (i.e., covers the edge including the outermost periphery 120A of the Fresnel lens 120). In this manner, occurrence of an open circuit can be effectively reduced or prevented when the flat part 122 fills the gaps in the edge including at least the outermost periphery 120A.

Figure 3B:
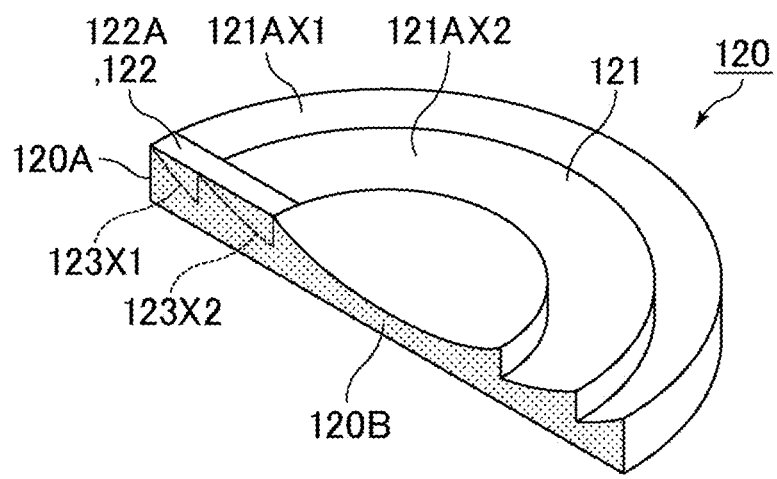
FIG. 3B is a schematic perspective view of another example of the Fresnel lens in the liquid crystal lens of Embodiment 1.

FIG. 3B is a schematic perspective view of another example of the Fresnel lens in the liquid crystal lens of Embodiment 1. As shown in FIG. 3B, the flat surface 122A may cover the region 123X1 corresponding to the refractive surface 121AX1 at the outermost periphery 120A of the Fresnel lens 120 and a region 123X2 corresponding to a refractive surface 121AX2 at an inner position relative to the outermost periphery 120A. The flat part 122 may fill the gaps from the outermost periphery 120A up to somewhere in the path from the outermost periphery 120A to the center 120B.

Figure 3C:
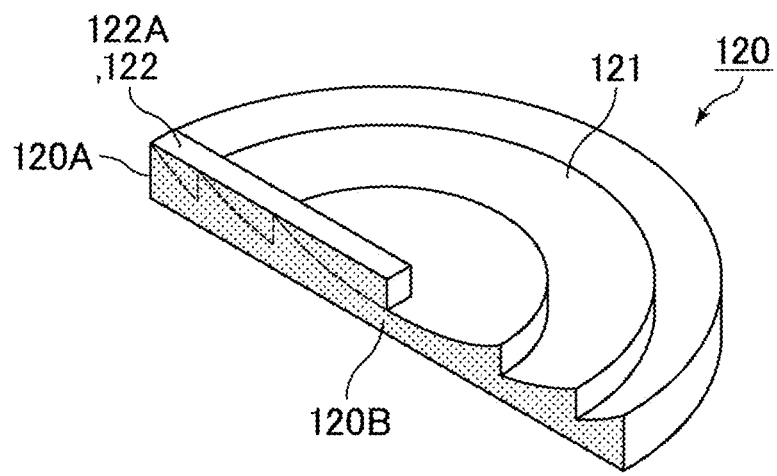
FIG. 3C is a schematic perspective view of yet another example of the Fresnel lens in the liquid crystal lens of Embodiment 1.

FIG. 3C is a schematic perspective view of yet another example of the Fresnel lens in the liquid crystal lens of Embodiment 1. As shown in FIG. 3C, the flat surface 122A in a plan view may extend linearly from the outermost periphery 120A of the Fresnel lens 120 to the center 120B of the Fresnel lens 120. This configuration can prevent occurrence of an open circuit in the diametral direction of the liquid crystal lens 10.

Figure 3D:
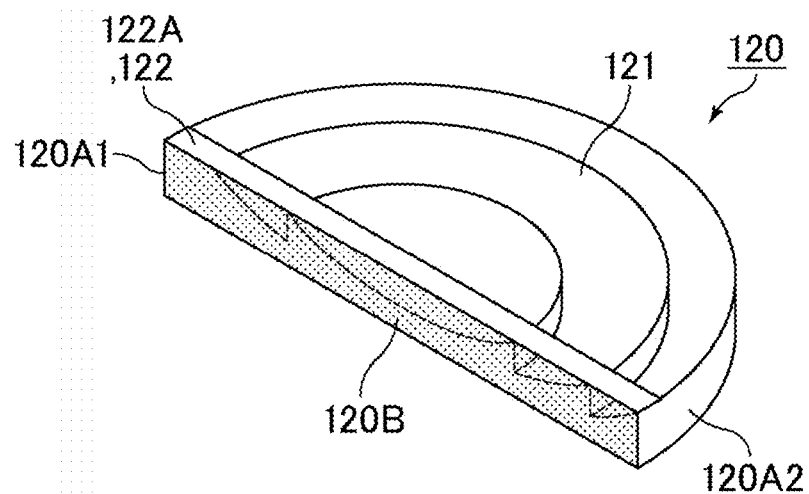
FIG. 3D is a schematic perspective view of yet another example of the Fresnel lens in the liquid crystal lens of Embodiment 1.

FIG. 3D is a schematic perspective view of yet another example of the Fresnel lens in the liquid crystal lens of Embodiment 1. As shown in FIG. 3D, the flat surface 122A in a plan view may extend linearly from an outermost periphery 120A1 of the Fresnel lens 120 to an outermost periphery 120A2 facing the outermost periphery 120A1.

Figure 3E:
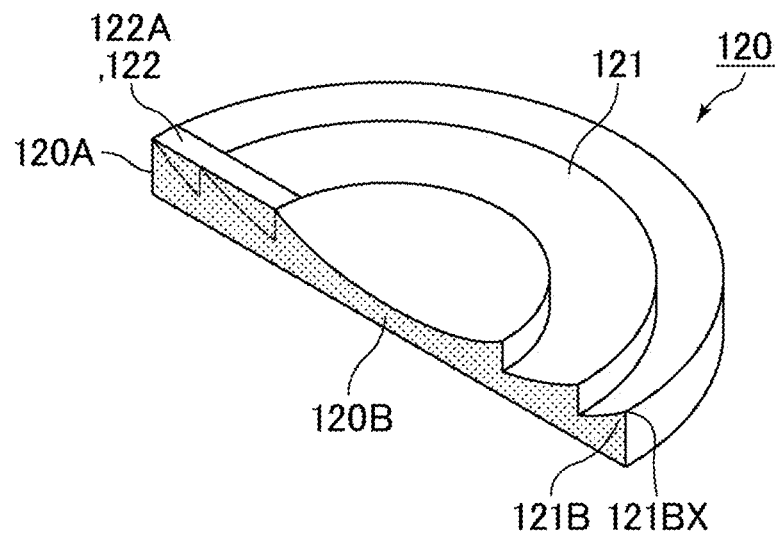
FIG. 3E is a schematic perspective view of yet another example of the Fresnel lens in the liquid crystal lens of Embodiment 1.

FIG. 3E is a schematic perspective view of yet another example of the Fresnel lens in the liquid crystal lens of Embodiment 1. As shown in FIG. 3E, preferably, the flat surface 122A is disposed at the same height as vertices 121BX of the uneven surface 121B or higher than the vertices 121BX of the uneven surface 121B. In other words, preferably, the flat surface 122A is disposed at the same height as the vertices 121BX of the uneven surface 121B or closer to the liquid crystal layer 300 than the vertices 121BX are. This configuration enables the flat part 122 to fill the gaps due to the Fresnel shape, thus facilitating production of a mold for the Fresnel lens 120. The heights of the vertices 121BX of the uneven surface 121B may be the same as or different from one another. When the heights of the vertices 121BX are different, the flat surface 122A is preferably disposed at the same height as the highest vertex 121BX among the vertices 121BX of the uneven surface 121B or higher than the highest vertex 121BX. This configuration can facilitate production of a mold for the Fresnel lens 120.

Figure 3F:
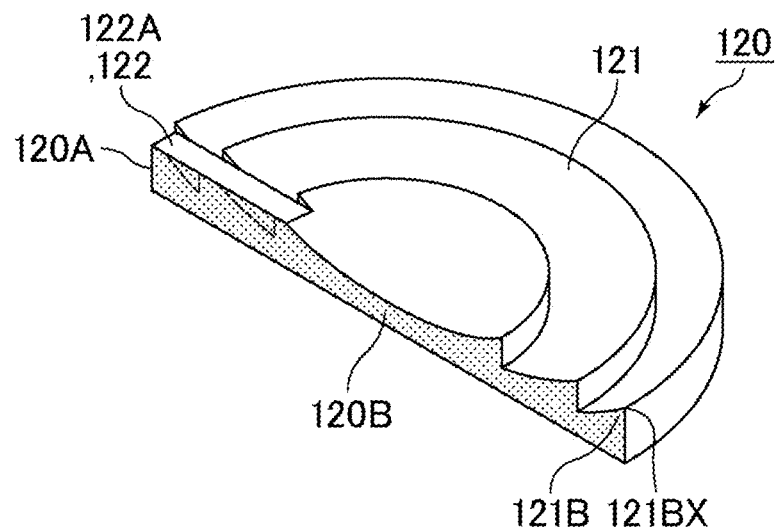
FIG. 3F is a schematic perspective view of yet another example of the Fresnel lens in the liquid crystal lens of Embodiment 1.

FIG. 3F is a schematic perspective view of yet another example of the Fresnel lens in the liquid crystal lens of Embodiment 1. The flat part may have a shape that completely fills the gaps due to the Fresnel shape as shown in FIG. 3E, or a shape that partially fills the gaps due to the Fresnel shape as shown in FIG. 3F. Specifically, the flat surface 122A may be disposed lower than the vertices 121BX of the uneven surface 121B. In this manner, the flat part 122 may be at a height where the flat part 122 partially fills the gaps due to the Fresnel shape (height where the steps of the Fresnel shape are partially flattened).

Although FIG. 3A to FIG. 3F show only one flat surface 122A, any number of flat surfaces 122A may be formed. The Fresnel lens 120 may include two or more flat surfaces 122A.

Figure 4A:
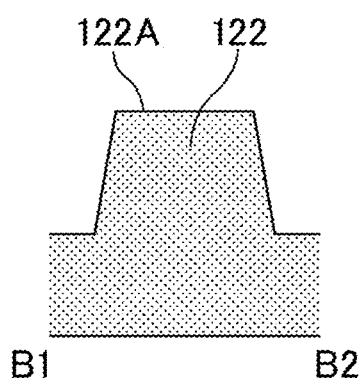
FIG. 4A is a schematic cross-sectional view of an example of the Fresnel lens in the liquid crystal lens of Embodiment 1, taken along line B1-B2 in FIG. 1.
Figure 4B:
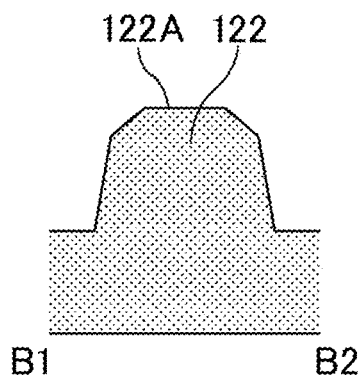
FIG. 4B is a schematic cross-sectional view of another example of the Fresnel lens in the liquid crystal lens of Embodiment 1, taken along line B1-B2 in FIG. 1.

FIG. 4A and FIG. 4B each are a schematic cross-sectional view of an example of the Fresnel lens in the liquid crystal lens of Embodiment 1, taken along line B1-B2 in FIG. 1. Preferably, as shown in FIG. 4A and FIG. 4B, the flat part 122 has a tapered shape with a width that decreases toward the liquid crystal layer 300. This configuration allows the conductive lines (e.g., first electrode 130), when disposed on the Fresnel lens 120, to curve gently, thus effectively reducing or preventing occurrence of an open circuit in the circumferential direction of the liquid crystal lens 10. Specifically, preferably, the portions of the flat part 122 connected to the Fresnel-shaped part 121 have a tapered shape with a width decreasing toward the liquid crystal layer 300.

As shown in FIG. 2A, the refractive surfaces 121AX are oblique to a bottom surface 120U of the Fresnel lens 120. The non-refractive surfaces 121AY are perpendicular to the bottom surface 120U. The angle formed by each refractive surface 121AX and the corresponding non-refractive surface 121AY, i.e., the angle of the vertices 121BX, preferably increases from the center 120B of the Fresnel lens 120 toward the outermost periphery 120A of the Fresnel lens 120. This configuration can increase the refractive index for light as the light travels away from the center 120B of the Fresnel lens 120, so that the light-gathering power of the Fresnel lens 120 can be increased.

The Fresnel lens 120 preferably includes a resin, more preferably a transparent resin having a refractive index of 1.4 to 1.8. Examples of the transparent resin having a refractive index of 1.4 to 1.8 include acrylic resin, polycarbonate resin, and polyethylene resin. Herein, the transparent resin means one having a transmittance, excluding interfacial reflection, for light in the visible range (wavelength of 380 to 780 nm) of 90% or higher when formed into a 1-mm-thick plate.

The liquid crystal layer 300 contains a liquid crystal material and controls the amount of light passing therethrough by changing the alignment of the liquid crystal molecules 310 in the liquid crystal material according to the voltage applied to the liquid crystal layer.

The liquid crystal molecules 310 have an anisotropic refractive index. In the liquid crystal lens 10, the voltage applied between the first electrode 130 and the second electrode 220 is varied to control the alignment of the liquid crystal molecules 310, so that the refractive index of the liquid crystal layer 300 for incident light can be varied between the extraordinary refractive index (ne) and the ordinary refractive index (no). The refractive indices satisfy the relationship ne>no. The liquid crystal lens 10 which is based on these principles basically can turn on or off the lens functions for only one of s-polarized light and p-polarized light.

The liquid crystal molecules 310 may have a positive or negative anisotropy of dielectric constant ($\Delta\varepsilon$) according to the following (formula L). The liquid crystal molecules 310 having a positive anisotropy of dielectric constant are also referred to as positive liquid crystals. The liquid crystal molecules 310 having a negative anisotropy of dielectric constant are also referred to as negative liquid crystals. The long axis direction of the liquid crystal molecules 310 corresponds to the direction of the slow axis. The liquid crystal molecules 310 with no voltage applied are homogeneously aligned. The azimuth of the long axes of the liquid crystal molecules with no voltage applied is also referred to as the initial alignment azimuth of the liquid crystal molecules.

$\Delta\varepsilon$=(dielectric constant in long axis direction of liquid crystal molecules)−(dielectric constant in short axis direction of liquid crystal molecules)  (formula L)

Preferably, the liquid crystal layer 300 has a nematic-isotropic phase transition temperature (Tni) of 110° C. or higher. This configuration can stabilize the interfacial refractive index with no voltage applied. For example, when the liquid crystal layer has a Tni of lower than 110° C., the liquid crystal layer contains liquid crystal molecules having a positive anisotropy of dielectric constant, and the liquid crystal molecules with no voltage applied are aligned horizontally to the alignment films, the lens effect may not be completely removed with no voltage applied, which may lead to an unintentional lens effect. With the liquid crystal layer 300 having a Tni of 110° C. or higher, the lens effect can be effectively exerted with no voltage applied.

Liquid crystal layers having a low Tni typically tend to cause a high degree of misalignment. With a liquid crystal layer having a high Tni (e.g., Tni of 110° or higher), the elastic constant of the liquid crystal layer may be high and thus reduce the chances of misalignment. This can further stabilize the alignment of liquid crystal molecules with no voltage applied, also stabilize the interfacial refractive index, and thus achieve the desired lens effect.

Preferably, the liquid crystal layer 300 has a birefringence $\Delta n$ of 0.20 or higher at a wavelength of 589 nm. This configuration can increase the refractive power of the liquid crystal lens 10. In other words, the modulation width of the liquid crystal lens 10 can be widened. Preferably, the liquid crystal layer 300 has a $\Delta n$ of 0.30 or higher at a wavelength of 589 nm.

Preferably, the liquid crystal molecules 310 each have at least one bond selected from the group consisting of —C≡C— (acetylene bond), —CH═CH—, —CF═CF—, —CF═CH—, —CH═CF—, —(CO)O—, —O(CO)—, and —O—. This configuration can increase the Tni and Δn of the liquid crystal layer 300. The liquid crystal molecules 310 each more preferably have a —C≡C— bond, still more preferably a tolane structure (diphenylacetylene structure). This configuration can further increase the Δn of the liquid crystal layer 300.

Preferably, the liquid crystal molecules 310 each have at its end at least one functional group selected from the group consisting of halogen (F, Cl, Br groups), SCN, NCS, CN, OCN, NCO, $CF_3$, $OCF_3$, and $SF_5$ groups. This configuration also can increase the Tni and Δn of the liquid crystal layer 300.

Preferably, the liquid crystal molecules 310 have a positive anisotropy of dielectric constant, and the ordinary refractive index no of the liquid crystal molecules 310 is equal to the refractive index of the Fresnel lens 120. This configuration can effectively turn on/off the lens functions. Here, the expression that the ordinary refractive index no of the liquid crystal molecules is equal to the refractive index of the Fresnel lens means that the difference in refractive index between them is 0.05 or less.

The liquid crystal material described above exerts its effects especially in the liquid crystal lens 10 of the present embodiment including the Fresnel lens 120 in the liquid crystal cell. Since the present embodiment includes the Fresnel lens 120 in the liquid crystal cell, there are regions where the liquid crystal layer is thick due to the uneven structure of the Fresnel lens 120. Liquid crystal molecules are typically aligned in one direction by the alignment regulating force provided by alignment films on the surfaces of a pair of substrates. Such alignment is easily disturbed when the liquid crystal layer is thick. Even under such conditions, use of the liquid crystal material above can stabilize the alignment of liquid crystal molecules.

The liquid crystal material described above exerts its effect especially in a configuration including an alignment film only on the later-described substrate (second substrate 200) with no Fresnel lens (i.e., in a mode where no first alignment film 31 is used and only the second alignment film 32 is used). With alignment films on substrates on both sides, liquid crystal molecules are easily aligned by the alignment regulating forces from both sides. Meanwhile, with an alignment film only on a substrate on one side, liquid crystal molecules need to be aligned by the alignment regulating force from the one side. Even in such a case, use of the liquid crystal material described above can stabilize the alignment of liquid crystal molecules.

Also preferably, for stabilization of the alignment of the liquid crystal molecules 310 near the substrate (first substrate 100) with the Fresnel lens 120, polymer sustained alignment (PSA) treatment is performed as described later. In this case, preferably, a photopolymerizable monomer is added to the liquid crystal material. The addition concentration is preferably 0.01 wt % to 10 wt %, more preferably 0.1 wt % to 2 wt %.

The first alignment film 31 and the second alignment film 32 have a function of controlling the alignment of the liquid crystal molecules 310 in the liquid crystal layer 300. With no voltage applied, the alignment of the liquid crystal molecules 310 in the liquid crystal layer 300 is controlled mainly by the actions of the first alignment film 31 and the second alignment film 32. The first alignment film 31 and the second alignment film 32 can be made of a material commonly used in the field of liquid crystal panels, such as a polymer having a polyimide structure in its main chain, a polymer having a polyamic acid structure in its main chain, or a polymer having a polysiloxane structure in its main chain. The first alignment film 31 and the second alignment film 32 can be formed by applying an alignment film material to a substrate. The application method may be any method such as flexo printing or inkjet coating.

The first alignment film 31 and the second alignment film 32 may each be a horizontal alignment film that aligns the liquid crystal molecules 310 substantially horizontally to its surface, or a vertical alignment film that aligns the liquid crystal molecules 310 substantially vertically to its surface. The horizontal alignment film has a function of aligning liquid crystal molecules in a liquid crystal layer horizontally to its surface with no voltage applied. The expression that the horizontal alignment film aligns the liquid crystal molecules horizontally to its surface means that the pre-tilt angle of the liquid crystal molecules from the surface of the horizontal alignment film is 0° to 5°, preferably 0° to 2°, more preferably 0° to 1°. The vertical alignment film has a function of aligning liquid crystal molecules in a liquid crystal layer vertically to its surface with no voltage applied. The expression that the vertical alignment film aligns the liquid crystal molecules vertically to its surface means that the pre-tilt angle of the liquid crystal molecules from the surface of the vertical alignment film is 86° to °, preferably 87° to 89°, more preferably 87.5° to 89°. The pre-tilt angle of liquid crystal molecules means an angle at which the long axes of the liquid crystal molecules are inclined from the main surface of each substrate with no voltage applied.

The first alignment film 31 and the second alignment film 32 may each be a photoalignment film, a rubbed alignment film, or an alignment film having undergone no alignment treatment. The photoalignment film contains a polymer having a photo-functional group and has undergone as the alignment treatment a photoalignment treatment where the film is irradiated with light (e.g., linearly polarized ultraviolet light) from a predetermined direction. The rubbed alignment film has undergone the rubbing treatment as the alignment treatment. The polymer having a photo-functional group is preferably a polymer having as a photo-functional group a cyclobutane ring which is an aliphatic polycyclic structure (photolysis polymer).

Preferably, the second alignment film 32 contains a polymer having a cyclic aliphatic group (alicyclic group). For an increase in refractive power of a liquid crystal lens, a liquid crystal layer having a high refractive index difference (birefringence Δn) is sometimes used. However, liquid crystal molecules in such a liquid crystal layer having a high refractive index difference are easily excited by light, and are thus likely to be unreliable. In contrast, an alignment film containing a polymer pacing an alicyclic group does not easily transmit light (especially ultraviolet light) to the liquid crystal layer. Thus, when the second alignment film 32 contains a polymer having a cyclic aliphatic group, the chances that the liquid crystal molecules 310 are excited by light are reduced even when the liquid crystal layer 300 having a high refractive index difference is used for an increase in refractive power of the liquid crystal lens 10. This can reduce a decline in reliability. Also, when the second alignment film 32 contains a polymer having a cyclic aliphatic group, the chances of coloring of the second alignment film 32 can be reduced, so that the transmittance can be enhanced. This can lead to a high degree of transparency of the liquid crystal lens 10.

Similarly, the first alignment film 31 also preferably contains a polymer having a cyclic aliphatic group. In this configuration, the chances that the liquid crystal molecules 310 are excited by light are reduced even when the liquid crystal layer 300 having a high refractive index difference is used for an increase in refractive power of the liquid crystal lens 10. This can reduce a decline in reliability. Also, the chances of coloring of the first alignment film 31 can be reduced, so that the transmittance can be enhanced. This can lead to a high degree of transparency of the liquid crystal lens 10.

Preferably, the first alignment film 31 and the second alignment film 32 each contain a polymer having a structure represented by the following general formula (P-1). Structures represented by the following general formula (P-1) have a polyamic acid skeleton.

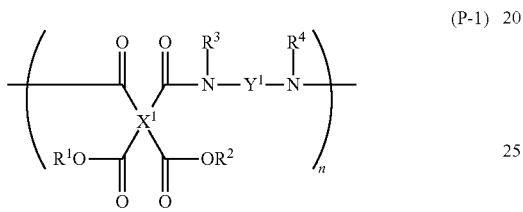
(P-1)

In the formula, $X^1$ represents a tetravalent aliphatic group, $Y^1$ represents a divalent organic group, $R^1$, $R^2$, $R^3$ and $R^4$ each independently represent a hydrogen atom or a monovalent hydrocarbon group, and n is an integer of 1 or greater.

In general formula (P-1), $X^1$ preferably has a group represented by any of the following general formulas (X-1) to (X-14). This configuration can enhance the reliability of the liquid crystal molecules 310 and achieve a liquid crystal lens 10 with a high degree of transparency.

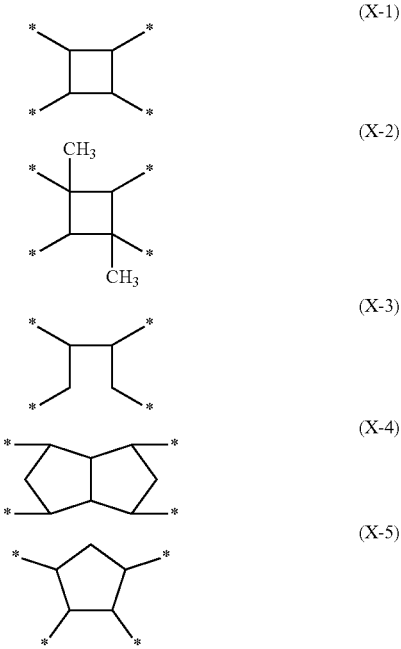

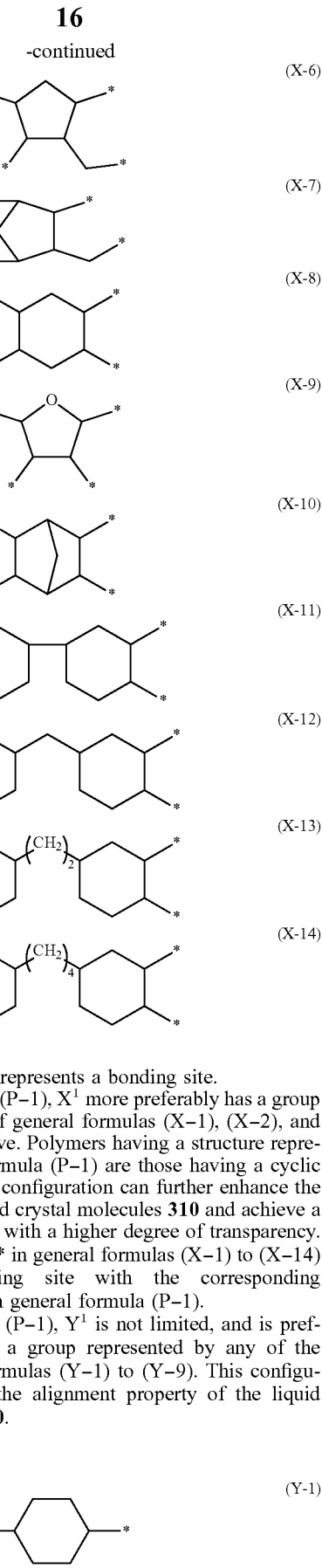

In the formulas, * represents a bonding site.

In general formula (P-1), $X^1$ more preferably has a group represented by any of general formulas (X-1), (X-2), and (X-4) to (X-14) above. Polymers having a structure represented by general formula (P-1) are those having a cyclic aliphatic group. This configuration can further enhance the reliability of the liquid crystal molecules 310 and achieve a liquid crystal lens 10 with a higher degree of transparency.

More specifically, * in general formulas (X-1) to (X-14) represents a bonding site with the corresponding —C(=O)— group in general formula (P-1).

In general formula (P-1), $Y^1$ is not limited, and is preferably, for example, a group represented by any of the following general formulas (Y-1) to (Y-9). This configuration can enhance the alignment property of the liquid crystal molecules 310.

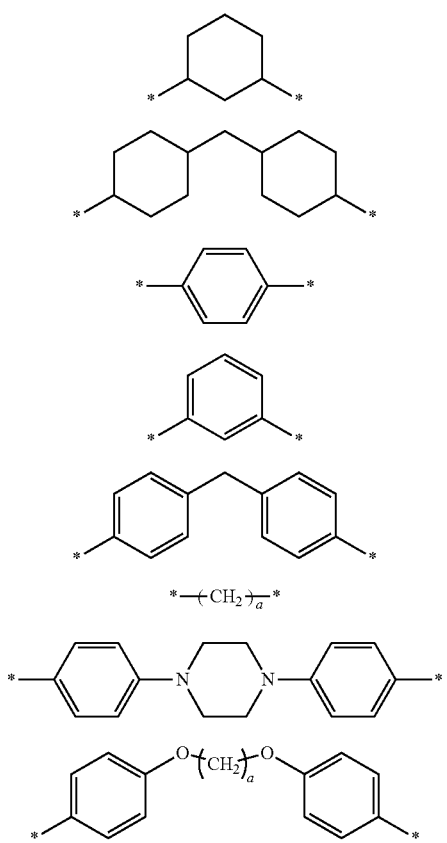

(Y-2), (Y-3), (Y-4), (Y-5), (Y-6), (Y-7), (Y-8), (Y-9)

In the formulas, a represents an integer of 1 or greater and 10 or smaller, and * represents a bonding site.

More specifically, * in general formulas (Y-1) to (Y-9) represents a bonding site with the —N(R$^3$)— group or the N(R$^4$)— group in general formula (P-1).

R$^1$, R$^2$, R$^3$, and R$^4$ in general formula (P-1) each independently represent a hydrogen atom or a monovalent hydrocarbon group. The monovalent hydrocarbon group is preferably a C1-C20 alkyl group, more preferably a C1-C3 alkyl group, still more preferably a methyl group or an ethyl group. The alkyl group may have a linear or branched structure. R$^1$, R$^2$, R$^3$, and R$^4$ particularly preferably each independently represent a hydrogen atom, a methyl group, or an ethyl group.

In general formula (P-1), n is an integer of 1 or greater. The upper limit is not limited, and is 1000 or smaller, for example.

The polymer having a cyclic aliphatic group may be, for example, a homopolymer consisting of a repeating unit having a structure represented by general formula (P-1) (where X$^1$ has a group represented by any of general formulas (X-1), (X-2), and (X-4) to (X-14)), or a copolymer including a repeating unit having a structure represented by general formula (P-1) (where X$^1$ has a group represented by any of general formulas (X-1), (X-2), and (X-4) to (X-14)) and a repeating unit having a different structure. Examples of the different structure include a structure in which the group corresponding to X$^1$ in general formula (P-1) is an aromatic group. In the polymer having a cyclic aliphatic group, preferably, 50 mol % or more of all the repeating units have a cyclic aliphatic group.

The alignment film containing a polymer having a cyclic aliphatic group may contain one or more polymers having different structures as well as the polymer having a cyclic aliphatic group. Examples of the different structures include a structure in which the group corresponding to X$^1$ in general formula (P-1) is an aromatic group. Preferably, in the alignment film containing a polymer having a cyclic aliphatic group, 50 mol % or more of all the repeating units, which is the sum of the repeating units of all the polymers in the alignment film, have a cyclic aliphatic group.

The liquid crystal lens 10, as in the present embodiment, may include the first alignment film 31 between the first substrate 100 and the liquid crystal layer 300 as well as the second alignment film 32. Yet, the liquid crystal lens 10 may include the second alignment film 32 and include no alignment film between the first substrate 100 and the liquid crystal layer 300. Since the substrate including the Fresnel lens is uneven with large recesses and projections, application of an alignment film material for formation of an alignment film on the substrate may cause the liquid (alignment film material) to be accumulated in the recesses, which may change the shape of the Fresnel lens from the designed shape and thereby change the characteristics of the liquid crystal lens. In contrast, with an alignment film (second alignment film 32) only on the substrate (second substrate 200) including no Fresnel lens 120, the shape of the Fresnel lens 120 can be maintained, so that a change in characteristics of the liquid crystal lens 10 can be reduced or prevented.

On the substrate (first substrate 100) including the Fresnel lens 120, instead of disposing an alignment film, chemical treatment may be performed using a silane coupling agent described in JP H11-125823 A or JP 2001-021897 A, for example. Also, as described later, PSA treatment or alignment stabilization treatment using fine grooves may be performed.

Described above are alignment films containing a polymer having a polyamic acid (polyimide) skeleton as shown in general formula (P-1). Also, alignment films containing a polymer having a polysiloxane skeleton or a poly(meth) acrylic acid skeleton are preferred in terms of high degree of reliability and high transmittances.

As shown in FIG. 2A, the sealant 400 surrounds the liquid crystal layer 300 between the first substrate 100 and the second substrate 200 and has a function of sealing the liquid crystal layer 300. The sealant 400 also has a function of bonding the first substrate 100 and the second substrate 200 to each other. The sealant 400 has a frame shape surrounding the liquid crystal layer 300 in a plan view of the liquid crystal lens 10.

Preferably, the sealant 400 contains a cured product of a curable resin, for example. Examples of the curable resin include resins having at least one of a functional group reactive to ultraviolet light or a functional group reactive to heat. The curable resin preferably has a (meth)acryloyl group and/or an epoxy group for rapid progress of curing reaction and favorable adhesiveness. Examples of such a curable resin include (meth)acrylate resin and epoxy resin. Each of these resins may be used alone or two or more of these resins may be used in combination. The term "(meth) acrylic" herein means acrylic or methacrylic.

As shown in FIG. 2A, the liquid crystal lens 10 includes spacers 500. The spacers 500 have a function of maintaining the gap in which the liquid crystal layer 300 is formed. With the spacers 500, the cell thickness can be controlled. The spacers 500 are in contact with at least of the first substrate 100 or the second substrate 200, and may be in contact with both substrates or only one of the substrates. In the present embodiment, the spacers 500 are on the first substrate 100. Yet, the spacers 500 may be disposed at any positions and may be disposed on the second substrate 200. The expression "in contact with" as used herein includes not only the case of direct contact but also the case of contact through other component(s).

The spacers 500 each have a columnar shape, for example. The planar shape of each spacer 500 may be, for example, a polygonal shape, a circular shape, or an elliptical shape.

Preferably, the spacers 500 contain a cured product of a photosensitive resin, for example. Examples of the photosensitive resin include resins having a functional group reactive to ultraviolet light. Preferably, the photosensitive resin has a (meth)acryloyl group. Examples of such a photosensitive resin include (meth)acrylate resin.

Preferably, the height of each spacer 500 is 1 μm or higher and 5 μm or lower, and the diameter of each spacer 500 in a plan view is 5 μm or greater and 20 μm or smaller. The spacers 500 having such a shape are easy to produce.

Preferably, the spacers 500 overlap the flat surface 122A. Conventional Fresnel lenses have only the Fresnel-shaped part without any flat part. This means that spacers overlap the uneven surface, which makes it difficult to stabilize the cell thickness. In contrast, the structure in which the spacers 500 overlap the flat surface 122A can stabilize the cell thickness.

Preferably, in a plan view, the width of the flat surface 122A is greater than the width of each spacer 500 by 5 μm or more and 20 μm or less. This configuration facilitates arrangement of the spacers 500 in a region(s) overlapping the flat surface 122A when the spacers 500 are on the second substrate 200 and the first substrate 100 is attached to the second substrate 200. For example, in a plan view, when the width of each spacer 500 is 5 μm or greater and 20 μm or smaller, the width of the flat surface 122A is preferably 10 μm or greater and 40 μm or smaller. Preferably, the spacers 500 are disposed on the liquid crystal layer 300 side of the flat surface 122A. This configuration can stabilize the cell thickness and reduce or prevent electrical connection between the first substrate 100 and the second substrate 200. Also, the spacers 500 can be made of the same material as the Fresnel lens 120 and integrally formed using a mold as with the flat part 122. The expression of being (disposed) "on the liquid crystal layer side" of a certain element as used herein includes not only the case of being disposed on a liquid crystal layer-facing surface of the certain element but also the case of being disposed on the liquid crystal layer-facing surface of the certain element through other component(s) except for the liquid crystal layer.

Figure 5:
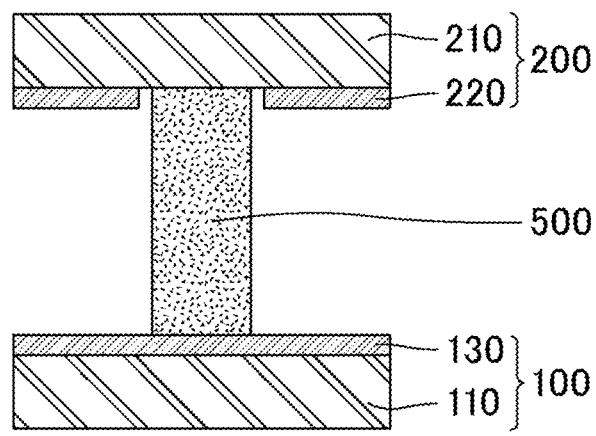
FIG. 5 is a schematic cross-sectional view of an example of the structure of a spacer in the liquid crystal lens of Embodiment 1.

FIG. 5 is a schematic cross-sectional view of an example of the structure of a spacer in the liquid crystal lens of Embodiment 1. The spacers 500 may be disposed on the second substrate 200, not on the first substrate 100. In this case, as shown in FIG. 5, preferably, the spacers 500 are disposed in a region that is disposed on the liquid crystal layer 300 side of the second substrate 200 and overlaps the flat surface 122A, and no conductive component is disposed in a region on the liquid crystal layer 300-facing surface of the second substrate 200 overlapping a spacer 500. This configuration also can stabilize the cell thickness and reduce or prevent electrical connection between the first substrate 100 and the second substrate 200. Examples of the conductive component include transparent conductive films, specifically the second electrode 220.

Electrical connection between the first substrate and the second substrate may lead to improper application of voltage to the liquid crystal lens. Also, unevenness in cell thickness affects the light-gathering efficiency of the liquid crystal lens, the stability of in-plane response of the liquid crystal molecules, and inclusion of air bubbles, for example. Thus, preferably, arrangement of the spacers is designed as described above, so that the cell thickness is stabilized and the electrical connection between the first substrate 100 and the second substrate 200 is reduced.

Figure 6:
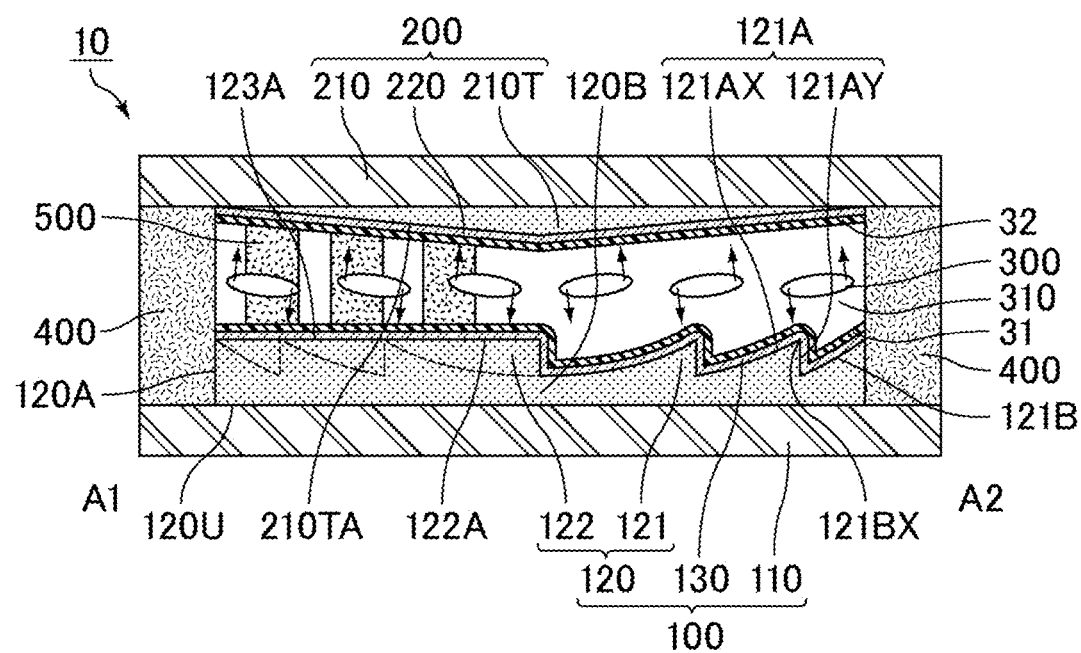
FIG. 6 is a schematic cross-sectional view of an example of the liquid crystal lens of Embodiment 1.

FIG. 6 is a schematic cross-sectional view of an example of the liquid crystal lens of Embodiment 1. As shown in FIG. 6, the second substrate 200 preferably includes, in the liquid crystal layer 300-facing surface thereof, a tapered portion 210T that is thick in its center and becomes thinner toward its periphery. Conventional Fresnel lenses, having only the Fresnel-shaped part without any flat part, are under the influence of the uneven surface of the Fresnel lens and therefore have difficulty in stabilizing the alignment of the liquid crystal molecules 310. However, when the second substrate 200 includes the tapered portion 210T in the liquid crystal layer 300-facing surface of the second substrate 200, the in-plane alignment of the liquid crystal molecules 310 can be stabilized.

In the liquid crystal Fresnel lens disclosed in JP 2009-98644 A, the liquid crystal molecules near the Fresnel lens surface of the first transparent substrate including the Fresnel lens are often tilted in different directions from the liquid crystal molecules near the flat surface of the second transparent substrate. This may easily cause disclination or a decline in response property of the liquid crystal molecules.

In a liquid crystal lens including a Fresnel lens in its substrate on one side, the steps and steep slopes of the Fresnel lens are likely to destabilize the alignment of liquid crystal molecules. In such a region where the alignment of the liquid crystal molecules is unstable, unintentional stray light such as scattered light may be produced. Also, the structure may affect the response speed in switching of the lens functions.

In the present embodiment, as shown in FIG. 6, preferably, the second substrate 200 includes the tapered portion 210T in the liquid crystal layer 300-facing surface of the second substrate 200, and the refractive surfaces 121AX of the Fresnel lens 120 are inclined along the tapered portion 210T. This configuration can, as shown in FIG. 6, allows the liquid crystal molecules 310 to rotate easily in the direction along the refractive surfaces 121AX of the Fresnel lens 120, thus stabilizing the alignment of the liquid crystal molecules 310. This can reduce or prevent disclination. In this manner, the alignment of the liquid crystal molecules 310 can be stabilized by changing the direction of rotation of the liquid crystal molecules 310 using the inclination directions of the refractive surfaces 121AX in the Fresnel lens 120 (the slope inclined upward to the left or the slop inclined upward to the right as shown in FIG. 6).

Preferably, the inclination of the tapered portion 210T, i.e., the angle formed by a liquid crystal layer 300-facing surface 210TA of the tapered portion 210T and the bottom surface 120U of the Fresnel lens 120, is 2° or smaller. This configuration can reduce the thickness of the liquid crystal lens 10.

The tapered portion 210T may overlap the entire Fresnel lens 120, or may be disposed only in the region overlapping the central part of the Fresnel lens 120, excluding the region overlapping the edge of the Fresnel lens 120. This configuration can effectively reduce the thickness of the liquid crystal lens 10 even when the diameter of the Fresnel lens 120 is large. The center of the Fresnel lens means the center of the Fresnel lens in a plan view. The central part of the Fresnel lens means a region at and near the center of the Fresnel lens in a plan view. The outermost periphery of the Fresnel lens means the outer periphery of the Fresnel lens in a plan view. The edge of the Fresnel lens means the edge region of the Fresnel lens including the outer periphery of the Fresnel lens in a plan view.

Preferably, the tapered portion 210T contains a transparent resin. Examples of the transparent resin include acrylic resin, polycarbonate resin, and polyethylene resin.

Figure 7:
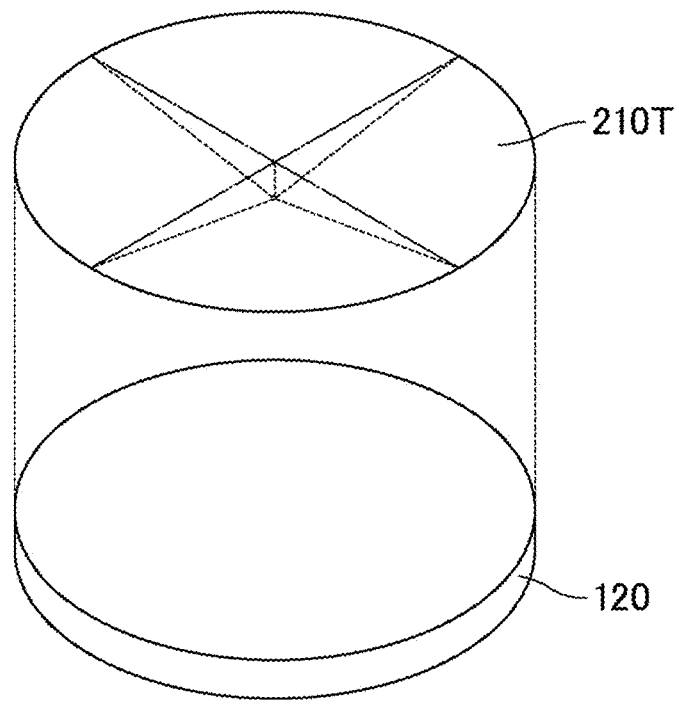
FIG. 7 is a schematic perspective view of an example of a tapered portion in the liquid crystal lens of Embodiment 1.

FIG. 7 is a schematic perspective view of an example of the tapered portion in the liquid crystal lens of Embodiment 1. The tapered portion 210T, for example, may have a conical shape as shown in FIG. 7 or a conical shape overlapping the entire Fresnel lens 120.

Figure 8:
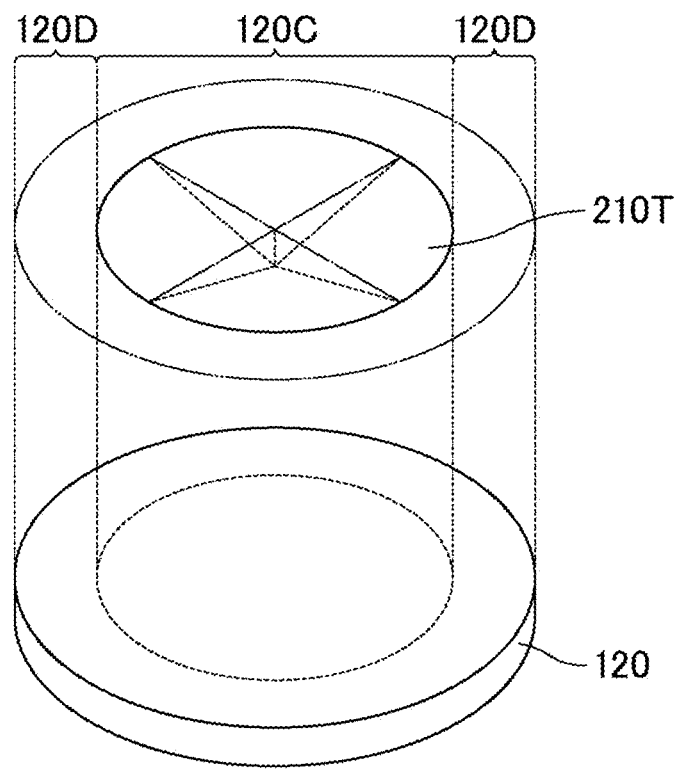
FIG. 8 is a schematic perspective view of another example of the tapered portion in the liquid crystal lens of Embodiment 1.

FIG. 8 is a schematic perspective view of another example of the tapered portion in the liquid crystal lens of Embodiment 1. The tapered portion 210T, for example, has a conical shape as shown in FIG. 8, and may be disposed in the region overlapping the central part 120C of the Fresnel lens 120 but not in the region overlapping an edge 120D of the Fresnel lens.

As shown in FIG. 7 and FIG. 8, the tapered portion 210T in a plan view may be rotationally symmetric.

Figure 9:
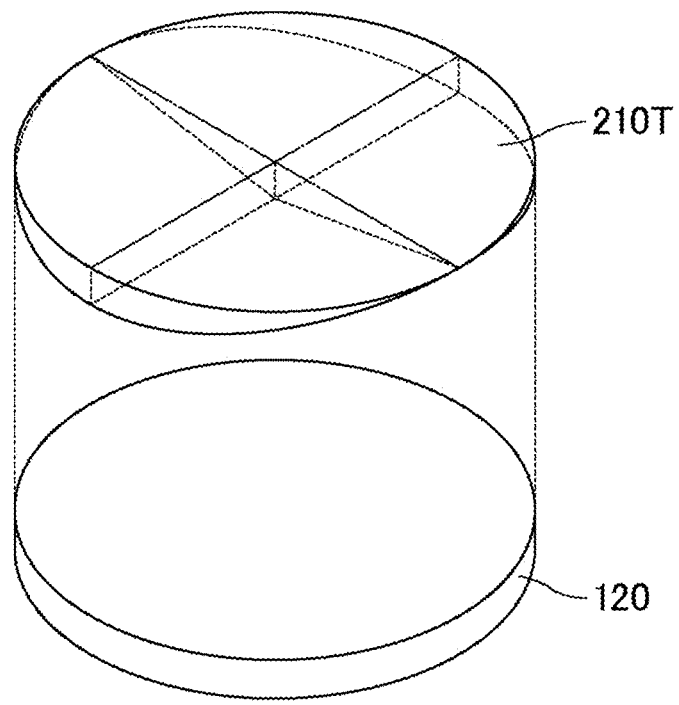
FIG. 9 is a schematic perspective view of yet another example of the tapered portion in the liquid crystal lens of Embodiment 1.

FIG. 9 is a schematic perspective view of yet another example of the tapered portion in the liquid crystal lens of Embodiment 1. The tapered portion 210T, for example, may have a shape with a bilaterally symmetric slope (shape obtained by rounding an isosceles triangular prism from the long sides thereof) as shown in FIG. 9.

Figure 10:
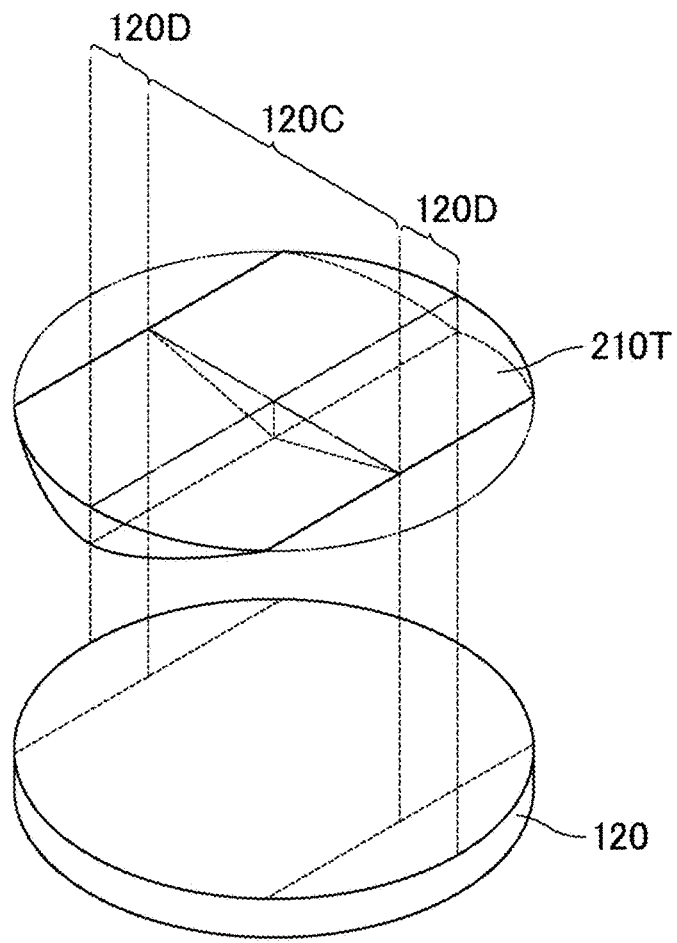
FIG. 10 is a schematic perspective view of yet another example of the tapered portion in the liquid crystal lens of Embodiment 1.

FIG. 10 is a schematic perspective view of yet another example of the tapered portion in the liquid crystal lens of Embodiment 1. The tapered portion 210T, for example, has a shape with a bilaterally symmetric slope (shape obtained by rounding an isosceles triangular prism from the long sides thereof) as shown in FIG. 10 and may be disposed in the region overlapping the central part 120C of the Fresnel lens 120 but not in the region overlapping the edge 120D of the Fresnel lens.

As shown in FIG. 9 and FIG. 10, the tapered portion 210T in a plan view may be symmetric about a line at an initial alignment azimuth of the liquid crystal molecules 310.

As described above, with the tapered portion 210T in the second substrate 200, the alignment of the liquid crystal molecules 310 can be stabilized.

Also, PSA treatment may be performed on the liquid crystal layer 300 side of the Fresnel lens 120, and an alignment maintenance layer that controls the alignment of the liquid crystal molecules 310 may be disposed on the liquid crystal layer 300 side of the Fresnel lens 120. This configuration also can stabilize the alignment of the liquid crystal molecules 310.

The alignment maintenance layer is a polymer layer formed by adding a polymerizable monomer to the liquid crystal layer and irradiating the liquid crystal layer with ultraviolet light to polymerize the polymerizable monomer after attachment of the substrates. Preferably, the polymerizable functional group of the polymerizable monomer constituting the alignment maintenance layer is a (meth)acrylate, vinyl, vinyloxy, or epoxy group. In other words, preferably, the polymer layer has a monomer unit derived from a monomer having at least one group selected from the group consisting of acrylate, methacrylate, vinyl, vinyloxy, and epoxy groups. In particular, acrylate and methacrylate groups are suitable.

Also, the polymerizable monomer desirably has a mesogen skeleton such as a biphenyl, naphthalene, anthracene, phenanthrene, or terphenyl structure. The polymerizable monomer is particularly preferably a monomer represented by any of the following chemical formulas (M1) to (M5).

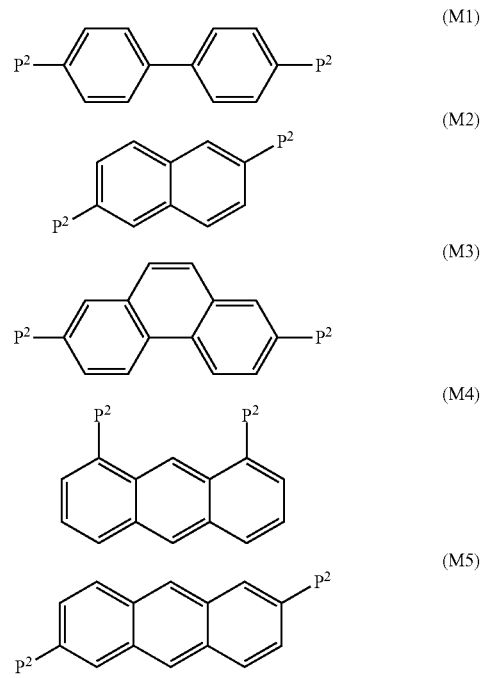

In the formulas, P 2 represents a polymerizable functional group.

Specifically, the alignment maintenance layer is preferably a polymer of a monomer represented by the following chemical formula (M11)).

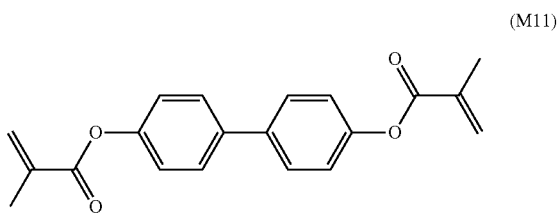 [SMILES: C=C(C)C(=O)Oc1ccc(-c2ccc(OC(=O)C(=C)C)cc2)cc1]

Figure 11:
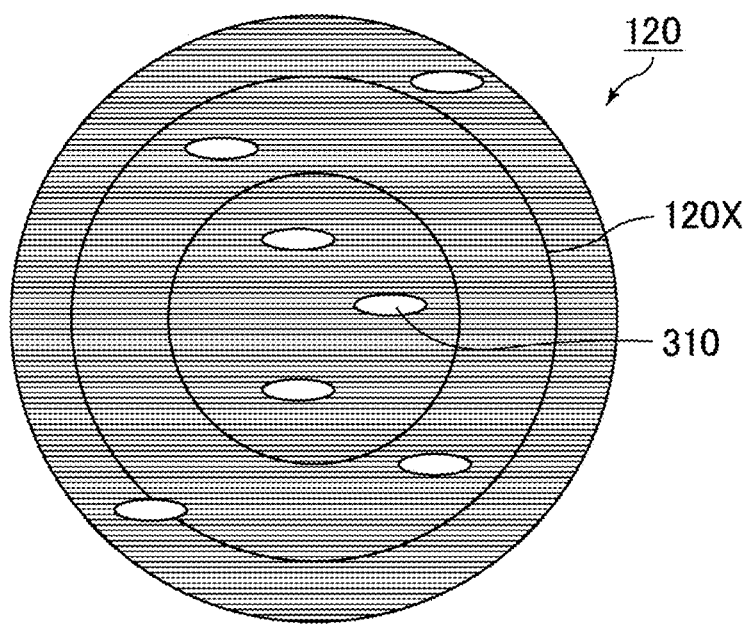
FIG. 11 is a schematic plan view of an example of the Fresnel lens in the liquid crystal lens of Embodiment 1.

FIG. 11 is a schematic plan view of an example of the Fresnel lens in the liquid crystal lens of Embodiment 1. In FIG. 11, the flat part 122 of the Fresnel lens 120 is omitted. As shown in FIG. 11, the Fresnel lens 120 may have a plurality of parallel grooves 120X in its liquid crystal layer 300-facing surface. This configuration also can stabilize the alignment of the liquid crystal molecules 310. Preferably, the width of each of the grooves 120X is nm or greater and 1000 nm or smaller, and the depth thereof is 10 nm or greater and 1000 nm or smaller.

Figure 12:
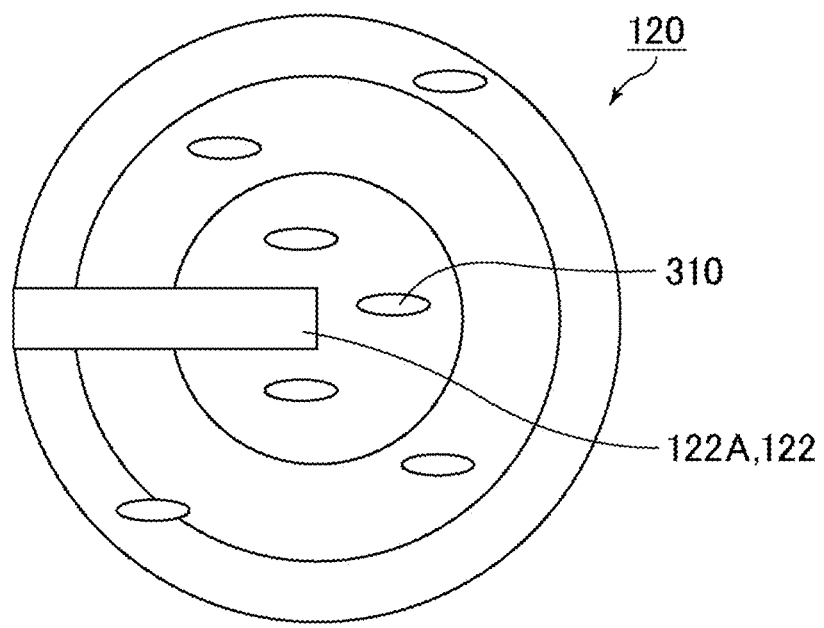
FIG. 12 is a schematic plan view of an example of the alignment of liquid crystal molecules in the liquid crystal lens of Embodiment 1.
Figure 13:
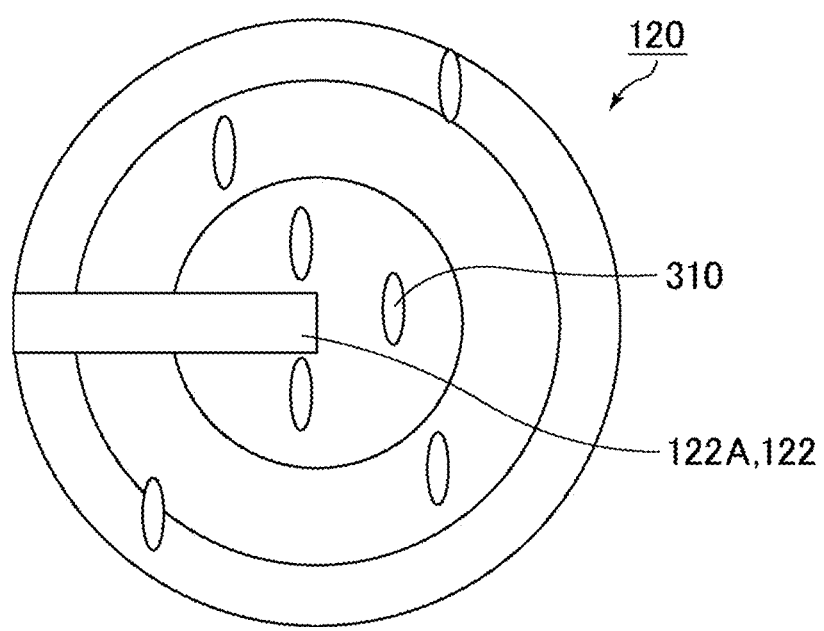
FIG. 13 is a schematic plan view of another example of the alignment of liquid crystal molecules in the liquid crystal lens of Embodiment 1.

FIG. 12 and FIG. 13 each are a schematic plan view of an example of the alignment of liquid crystal molecules in the liquid crystal lens of Embodiment 1. Preferably, as shown in FIG. 12 and FIG. 13, the initial alignment azimuth of the liquid crystal molecules 310 is parallel or perpendicular to the linear flat surface 122A. For effective actions by the liquid crystal lens, the refractive index difference needs to be as large as possible during turning on and off the voltage. Thus, preferably, light to be incident on the liquid crystal lens is linearly polarized light vibrating at an azimuth parallel to the initial alignment azimuth of the liquid crystal molecules 310. This is because while a structure parallel or perpendicular to linearly polarized light is not likely to disturb the polarization, a structure oblique to linearly polarized light is likely to disturb polarization and thus influences, though slightly, the lens functions.

Modified Example 1 of Embodiment 1

Figure 14:
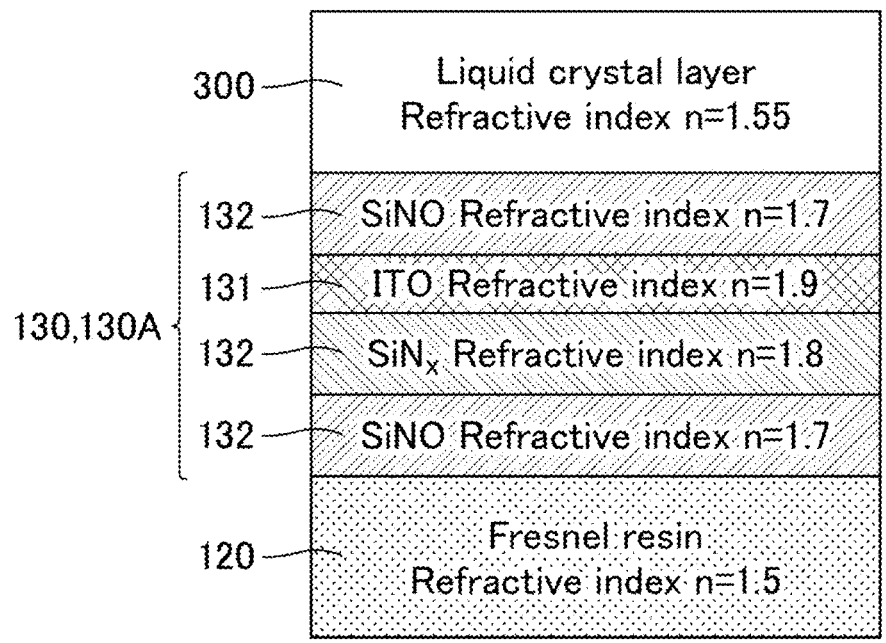
FIG. 14 is an exemplary schematic cross-sectional view of a first substrate-side portion in a liquid crystal lens of Modified Example 1 of Embodiment 1.
Figure 15:
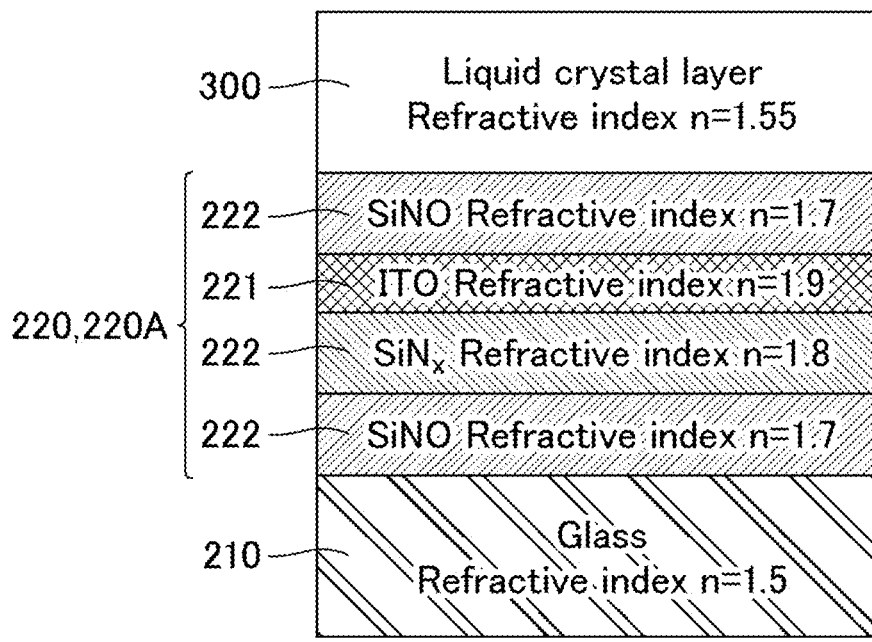
FIG. 15 is an exemplary schematic cross-sectional view of a second substrate-side portion in the liquid crystal lens of Modified Example 1 of Embodiment 1.
Figure 16:
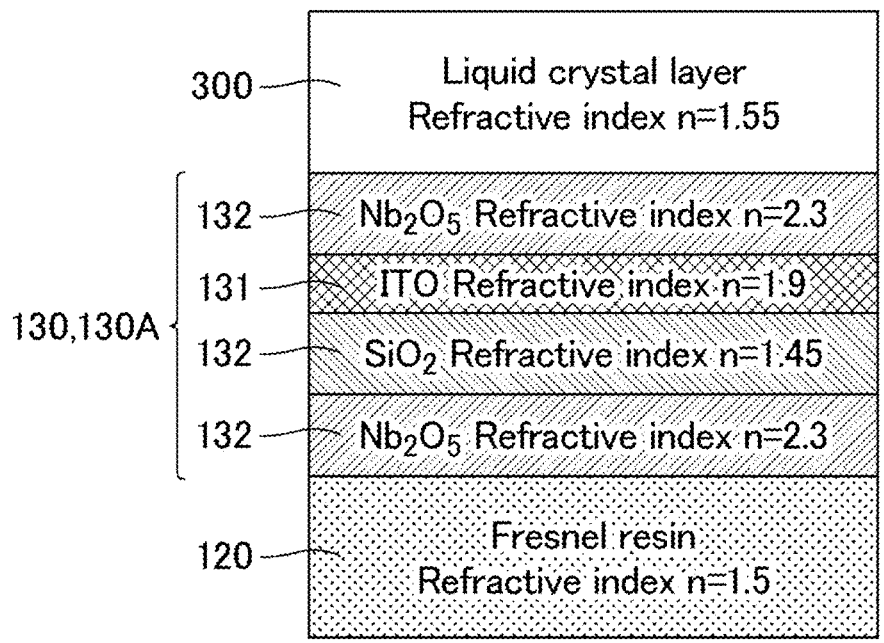
FIG. 16 is another exemplary schematic cross-sectional view of the first substrate-side portion in the liquid crystal lens of Modified Example 1 of Embodiment 1.
Figure 17:
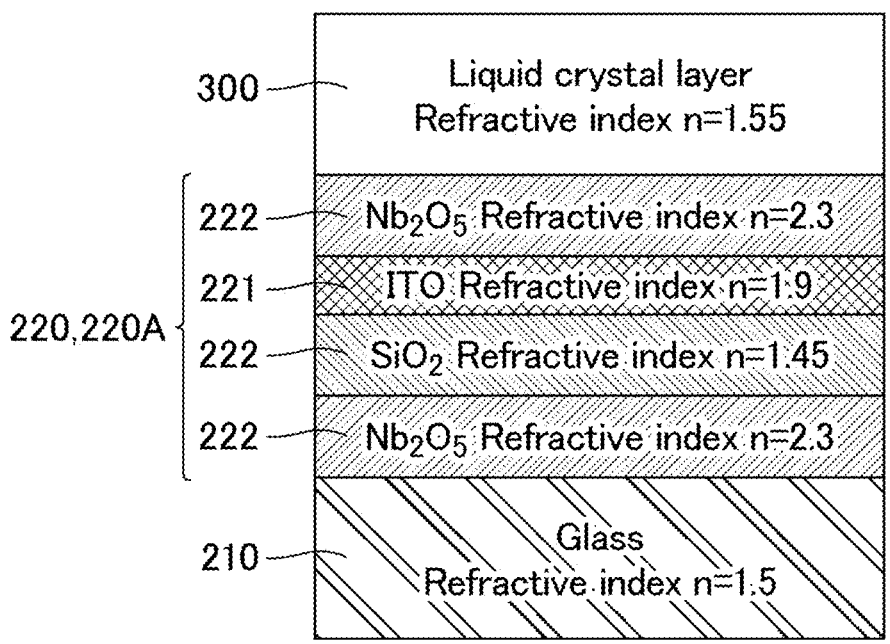
FIG. 17 is another exemplary schematic cross-sectional view of the second substrate-side portion in the liquid crystal lens of Modified Example 1 of Embodiment 1.
Figure 18:
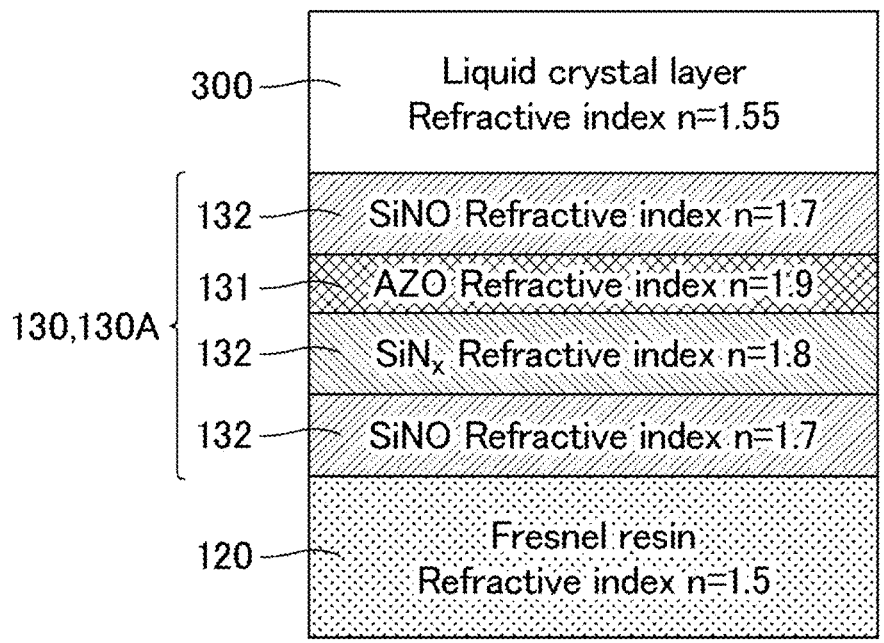
FIG. 18 is yet another exemplary schematic cross-sectional view of the first substrate-side portion in the liquid crystal lens of Modified Example 1 of Embodiment 1.
Figure 19:
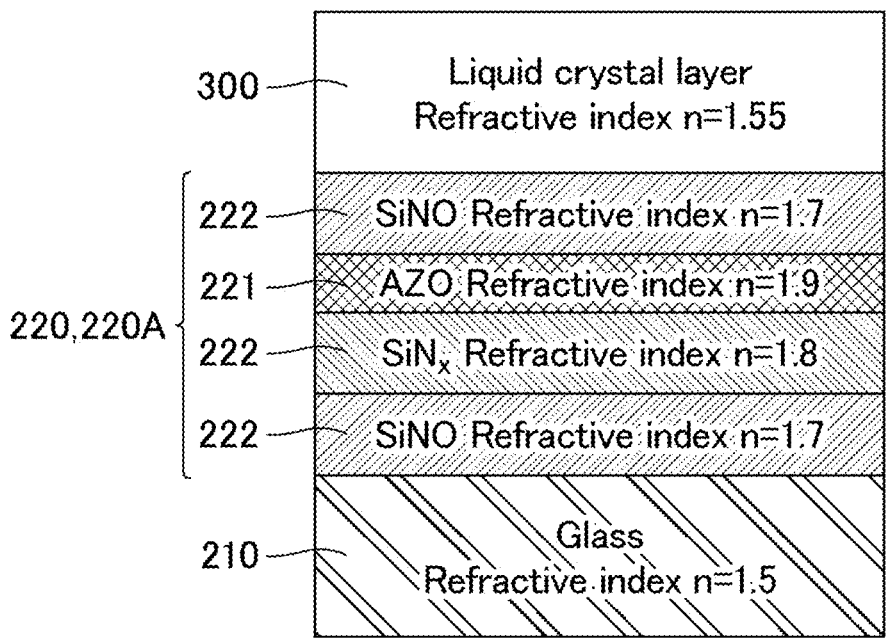
FIG. 19 is yet another exemplary schematic cross-sectional view of the second substrate-side portion in the liquid crystal lens of Modified Example 1 of Embodiment 1.

FIG. 14 is an exemplary schematic cross-sectional view of a first substrate-side portion in a liquid crystal lens of Modified Example 1 of Embodiment 1. FIG. 15 is an exemplary schematic cross-sectional view of a second substrate-side portion in the liquid crystal lens of Modified Example 1 of Embodiment 1. FIG. 16 is another exemplary schematic cross-sectional view of the first substrate-side portion in the liquid crystal lens of Modified Example 1 of Embodiment 1. FIG. 17 is another exemplary schematic cross-sectional view of the second substrate-side portion in the liquid crystal lens of Modified Example 1 of Embodiment 1. FIG. 18 is yet another exemplary schematic cross-sectional view of the first substrate-side portion in the liquid crystal lens of Modified Example 1 of Embodiment 1. FIG. 19 is yet another exemplary schematic cross-sectional view of the second substrate-side portion in the liquid crystal lens of Modified Example 1 of Embodiment 1. As shown in FIG. 14 to FIG. 19, in Embodiment 1, at least one of the first electrode 130 or the second electrode 220 may be a stack (130A or 220A) of films having different refractive indices. This configuration can reduce reflection and increase the transmittance.

The liquid crystal lens 10 of Embodiment 1 includes the first electrode 130 and the second electrode 220, which are transparent conductive films (also referred to as transparent electrode layers), for application of voltage to the liquid crystal layer 300. Here, common transparent conductive films such as ITO films have a high refractive index which may cause reflection in an interface, e.g., the Fresnel resin/ITO interface, the ITO/liquid crystal layer interface, or the ITO/glass interface, to decrease the transmittance of the device. The present modified example can reduce reflection and increase the transmittance since at least one of the first electrode 130 and the second electrode 220 is a stack (130A or 220A) of films having different refractive indices. The Fresnel resin is the resin constituting the Fresnel lens.

As shown in FIG. 14 to FIG. 19, preferably, the stack 130A includes a transparent conductive film 131 and at least one type of inorganic film 132, and the stack 220A includes a transparent conductive film 221 and at least one type of inorganic film 222. This configuration can more effectively reduce reflection and increase the transmittance.

The inorganic films 132 and 222 are suitably $SiO_2$, SiNO, $SiN_x$, or $Nb_2O_5$ films, for example.

The transparent conductive film 131 and the at least one type of inorganic film 132 constituting the stack 130A, and the transparent conductive film 221 and the at least one type of inorganic film 222 constituting the stack 220A are arranged such that, for example, as shown in FIG. 14 and FIG. 15, the magnitude of refractive index gradually varies.

When the first electrode 130 is the stack 130A, for example, as shown in FIG. 14, sequentially from the Fresnel lens 120 toward the liquid crystal layer 300, the Fresnel lens 120 (Fresnel resin, refractive index n=1.5), an inorganic film 132 (SiNO, refractive index n=1.7), another inorganic film 132 ($SiN_x$, refractive index n=1.8), the transparent conductive film 131 (ITO, refractive index n=1.9), yet another inorganic film 132 (SiNO, refractive index n=1.7), and the liquid crystal layer 300 (refractive index n=1.55) are arranged.

Similarly, when the second electrode 220 is the stack 220A, for example, as shown in FIG. 15, sequentially from the second support substrate 210 toward the liquid crystal layer 300, the second support substrate 210 (glass, refractive index n=1.5), an inorganic film 222 (SiNO, refractive index n=1.7), another inorganic film 222 ($SiN_x$, refractive index n=1.8), the transparent conductive film 221 (ITO, refractive index n=1.9), yet another inorganic film 222 (SiNO, refractive index n=1.7), and the liquid crystal layer 300 (refractive index n=1.55) are arranged.

The inorganic films 132 shown in FIG. 14 and FIG. 15 are common inorganic films used in liquid crystal panels and thus highly production friendly. The multi-layered film structure including the ITO film and the inorganic films 132 shown in FIG. 14 and FIG. 15 are also referred to as index-matched ITO (IM-ITO).

Also, as shown in FIG. 16 and FIG. 17, the transparent conductive films 131 and the at least one type of inorganic film 132 constituting the stack 130A and the transparent conductive film 221 and the at least one type of inorganic film 222 constituting the stack 220A may be arranged such that films having a higher magnitude of refractive index than an adjacent film and films having a lower magnitude of refractive index than an adjacent film are alternated. This configuration can cause multilayer interference to effectively reduce reflection and further increase the transmittance.

When the first electrode 130 is the stack 130A, for example, as shown in FIG. 16, sequentially from the Fresnel lens 120 toward the liquid crystal layer 300, the Fresnel lens 120 (Fresnel resin, refractive index n=1.5), an inorganic film 132 ($Nb_2O_5$, refractive index n=2.3), another inorganic film 132 ($SiO_2$, refractive index n=1.45), the transparent conductive film 131 (ITO, refractive index n=1.9), yet another inorganic film 132 ($Nb_2O_5$, refractive index n=2.3), and the liquid crystal layer 300 (refractive index n=1.55) are arranged.

Similarly, when the second electrode 220 is the stack 220A, for example, as shown in FIG. 17, sequentially from the second support substrate 210 toward the liquid crystal layer 300, the second support substrate 210 (glass, refractive index n=1.5), an inorganic film 222 ($Nb_2O_5$, refractive index n=2.3), another inorganic film 222 ($SiO_2$, refractive index n=1.45), the transparent conductive film 221 (ITO, refractive index n=1.9), yet another inorganic film 222 ($Nb_2O_5$, refractive index n=2.3), and the liquid crystal layer 300 (refractive index n=1.55) are arranged.

As shown in FIG. 14 to FIG. 17, the transparent conductive films 131 and 221 are typically ITO films. Yet, the transparent conductive films 131 and 221 may be films other than ITO films. For example, as shown in FIG. 18 and FIG. 19, AZO (ZnO doped with Al, refractive index n=1.9) films can also be used. Although having lower conductivity than ITO, AZO is highly transparent and is particularly suitable for liquid crystal lens uses.

Modified Example 2 of Embodiment 1

A liquid crystal lens 10 of the present modified example includes the first alignment film 31 between the first substrate 100 and the liquid crystal layer 300 and the second alignment film 32 between the second substrate 200 and the liquid crystal layer 300. The first alignment film 31 may be a photoalignment film, while the second alignment film 32 may be a rubbed alignment film. When the liquid crystal molecules 310 are positive liquid crystals, the liquid crystal molecules 310 are horizontally aligned with no voltage applied, and vertically aligned with voltage applied (with vertical electric fields generated). Thus, a pre-tilt angle is preferably set for the liquid crystal molecules 310. For setting of the pre-tilt angle, the first alignment film 31 and the second alignment film 32 are preferably those having undergone rubbing treatment. However, the liquid crystal layer 300-facing surface of the first substrate 100 including the Fresnel lens 120 is uneven with projections and recesses, and an alignment film lying along the recesses cannot be rubbed with a rubbing cloth. This produces regions where the alignment film is not sufficiently imparted with the alignment regulating force. In the present modified example, the first alignment film 31 disposed near the first substrate 100 including the Fresnel lens 120 is a photoalignment film, so that alignment treatment can be appropriately performed even with such projections and recesses.

Modified Example 3 of Embodiment 1

Figure 20:
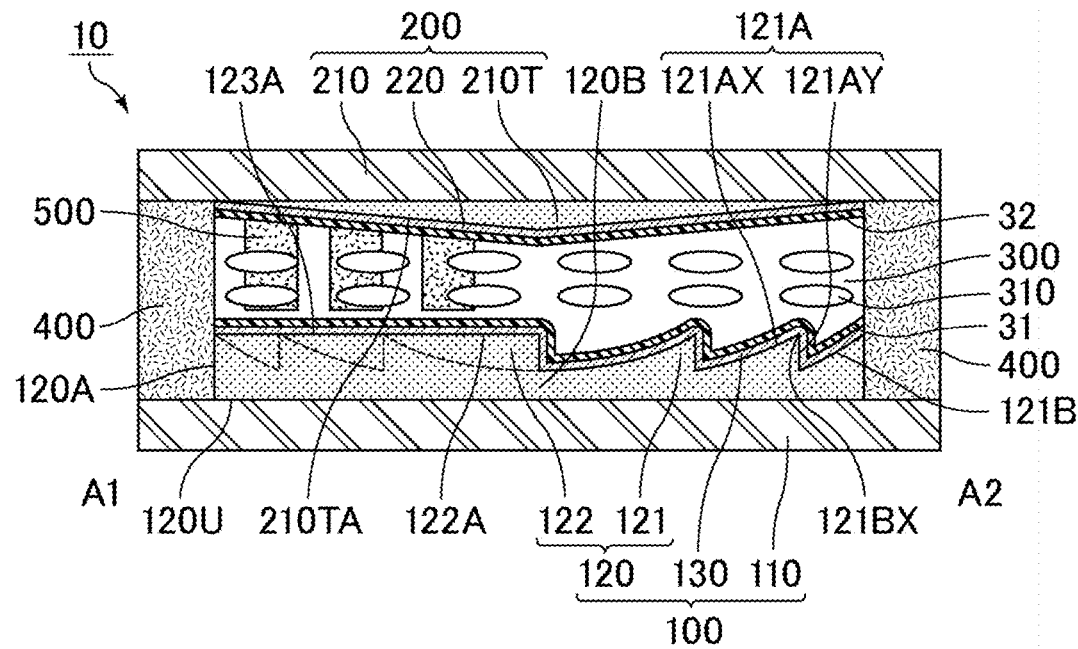
FIG. 20 is a schematic cross-sectional view of a liquid crystal lens of Modified Example 3 of Embodiment 1.

FIG. 20 is a schematic cross-sectional view of a liquid crystal lens of Modified Example 3 of Embodiment 1. As shown in FIG. 20, a liquid crystal lens 10 of the present modified example includes the first alignment film 31 between the first substrate 100 and the liquid crystal layer 300, the second alignment film 32 between the second substrate 200 and the liquid crystal layer 300, and the spacers 500 disposed on the liquid crystal layer 300 side of the second substrate 200. The second alignment film 32 may be a photoalignment film. When the second alignment film 32 near the second substrate 200 on which the spacers 500 are disposed is subjected to rubbing treatment, the spacers 500 disrupt the rubbing treatment. This may produce regions where the alignment treatment is not performed on the second alignment film 32. In the present modified example, since the second alignment film 32 is a photoalignment film, occurrence of a region can be reduced or prevented where the alignment treatment is not performed on the second alignment film 32 near the second substrate 200 on which the spacers 500 are disposed. The first alignment film 31 is, for example, a rubbed alignment film.

Modified Example 4 of Embodiment 1

Figure 21:
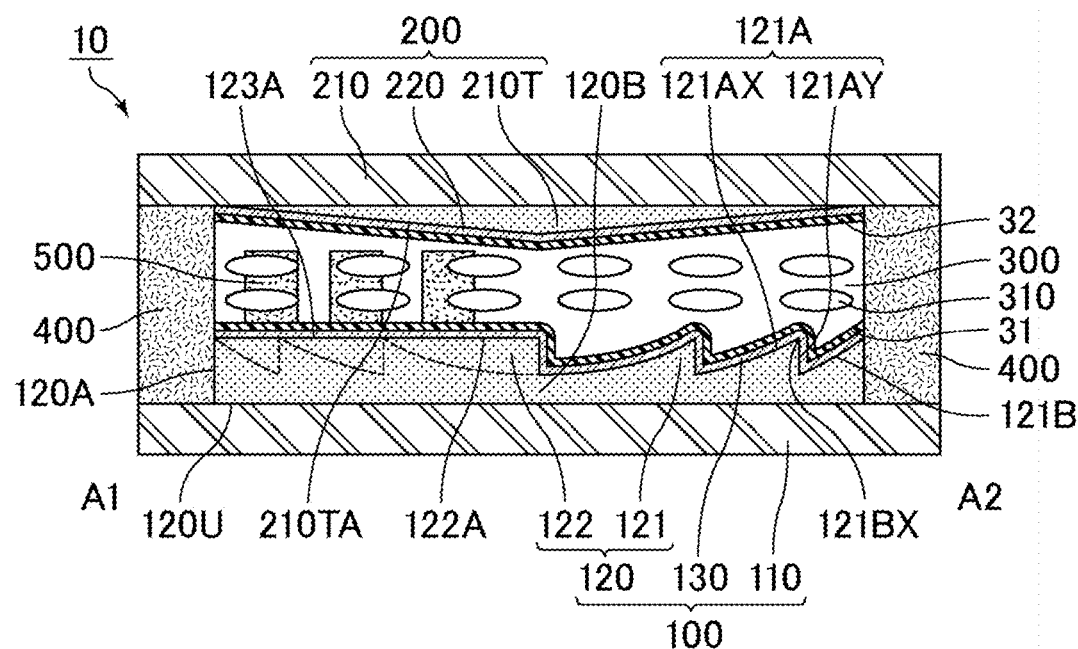
FIG. 21 is a schematic cross-sectional view of a liquid crystal lens of Modified Example 4 of Embodiment 1.

FIG. 21 is a schematic cross-sectional view of a liquid crystal lens of Modified Example 4 of Embodiment 1. As shown in FIG. 21, a liquid crystal lens 10 of the present modified example includes the first alignment film 31 between the first substrate 100 and the liquid crystal layer 300, the second alignment film 32 between the second substrate 200 and the liquid crystal layer 300, and the spacers 500 disposed on the liquid crystal layer 300 side of the first substrate 100. The first alignment film 31 may be a photoalignment film. When the first alignment film 31 near the first substrate 100 on which the spacers 500 are disposed is subjected to rubbing treatment, the spacers 500 disrupt the rubbing treatment. This may produce regions where the alignment treatment is not performed on the first alignment film 31. In the present modified example, since the first alignment film 31 is a photoalignment film, occurrence of a region can be reduced or prevented where the alignment treatment is not performed on the first alignment film 31 near the first substrate 100 on which the spacers 500 are disposed. The second alignment film 32 is, for example, a rubbed alignment film.

Modified Example 5 of Embodiment 1

While the liquid crystal lens 10 of Embodiment 1 includes one liquid crystal cell, the liquid crystal lens of the present modified example includes a plurality of liquid crystal cells. A stack including a pair of substrates, one of which includes a Fresnel lens, and a liquid crystal layer held between the substrates is also referred to as a liquid crystal cell.

Figure 22:
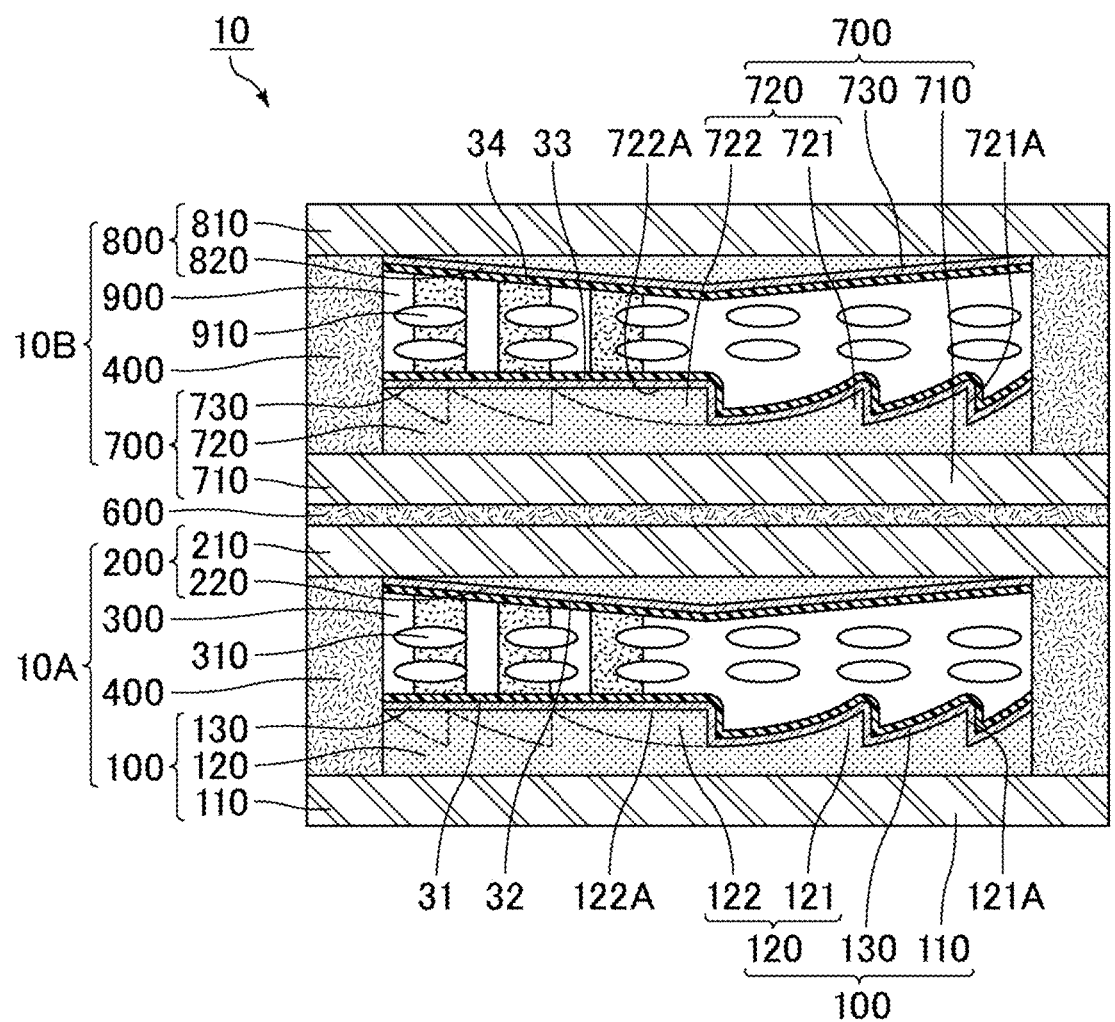
FIG. 22 is a schematic cross-sectional view of a liquid crystal lens of Modified Example 5 of Embodiment 1.

FIG. 22 is a schematic cross-sectional view of a liquid crystal lens of Modified Example 5 of Embodiment 1. The liquid crystal layer 300 is a first liquid crystal layer 300. The liquid crystal molecules 310 are first liquid crystal molecules 310. The Fresnel lens 120 is a first Fresnel lens 120. The annular lens surfaces 121A are first annular lens surfaces 121A. The Fresnel-shaped part 121 is a first Fresnel-shaped part 121. The concentric circle pattern is a first concentric circle pattern. The flat surface 122A is a first flat surface 122A. The flat part 122 is a first flat part 122. The liquid crystal lens further includes a third substrate 700 facing the first liquid crystal layer 300 across the second substrate 200 or facing the first liquid crystal layer 300 across the first substrate 100; a fourth substrate 800 facing the third substrate 700; and a second liquid crystal layer 900 held between the third substrate 700 and the fourth substrate 800 and containing second liquid crystal molecules 910. The third substrate 700 includes, sequentially toward the second liquid crystal layer 900, a second Fresnel lens 720 and a third electrode 730. The fourth substrate 800 includes a fourth electrode 820. The second Fresnel lens 720 includes a second Fresnel-shaped part 721 and a second flat part 722. The second Fresnel-shaped part 721 includes a plurality of second annular lens surfaces 721A disposed in a second concentric circle pattern. The second flat part 722 includes a second flat surface 722A that extends in a radial direction of the second concentric circle and intersects at least one of the second annular lens surfaces 722A. The second annular lens surfaces 721A are disposed on a second liquid crystal layer 900-facing surface of the second Fresnel-shaped part 721 and define an uneven surface. The second flat surface 722A is disposed on a second liquid crystal layer 900-facing surface of the second flat part 722.

The stack including the first substrate 100, the first liquid crystal layer 300, and the second substrate 200 is a first liquid crystal cell (first liquid crystal lens) 10A. The stack including the third substrate 700, the second liquid crystal layer 900, and the fourth substrate 800 is a second liquid crystal cell (second liquid crystal lens) 10B.

Although the liquid crystal lenses 10 of Embodiment 1 and the modified examples thereof each include one liquid crystal cell, the liquid crystal lens 10 of the present modified example includes a plurality of liquid crystal cells. Specifically, the liquid crystal lens 10 of the present modified example includes the first liquid crystal cell 10A and the second liquid crystal cell 10B. A liquid crystal lens including a plurality of liquid crystal cells is also referred to as a liquid crystal lens module.

While Embodiment 1 achieves, for example, the liquid crystal lens 10 having a focal length corresponding to power 8D with one liquid crystal cell, the liquid crystal lens 10 having the above focal length may be achieved with two liquid crystal cells 10A and 10B as in the present modified example. When the two liquid crystal cells 10A and 10B are used as in the present modified example, the power of one of the liquid crystal cells is, for example, 4D, so that the differences in height of the uneven surface of the Fresnel lens can be reduced. In other words, production of the Fresnel lens is facilitated. Also, substantially, the liquid crystal layer of one of the liquid crystal cells can be reduced in thickness, so that the response speed can be enhanced.

The liquid crystal lens 10 includes an adhesive layer 600 between the first liquid crystal cell 10A and the second liquid crystal cell 10B (specifically, between the second substrate 200 and the third substrate 700). The adhesive layer 600 is, for example, an optical clear adhesive (OCA) sheet.

The third substrate 700 is the same as the first substrate 100. The third support substrate 710 is the same as the first support substrate 110. The second Fresnel lens 720 is the same as the first Fresnel lens 120. The second Fresnel-shaped part 721 is the same as the first Fresnel-shaped part 121. The second annular lens surfaces 721A are the same as the annular lens surfaces 121A. The second flat part 722 is the same as the first flat part 122. The second flat surface 722A is the same as the first flat surface 122A. The third electrode 730 is the same as the first electrode 130. The fourth substrate 800 is the same as the second substrate 200. The fourth support substrate 810 is the same as the second support substrate 210. The fourth electrode 820 is the same as the second electrode 220. The second liquid crystal layer 900 is the same as the first liquid crystal layer 300. The second liquid crystal molecules 910 are the same as the first liquid crystal molecules 310.

The liquid crystal lens 10 may include a third alignment film 33 between the third substrate 700 and the second liquid crystal layer 900 and a fourth alignment film 34 between the fourth substrate 800 and the second liquid crystal layer 900, or may include only one of the third alignment film 33 and the fourth alignment film 34.

The alignment direction of the first liquid crystal molecules 310 and the alignment direction of the second liquid crystal molecules 910 are the same as each other or inverted from each other. Preferably, the alignment direction of the first liquid crystal molecules 310 and the alignment direction of the second liquid crystal molecules 910 are inverted from each other. When the alignment treatment is the rubbing treatment, liquid crystal molecules are pre-tilted in or near the substrate interface, i.e., liquid crystal molecules are aligned with a tilt in the direction vertical to the substrate, which means that there is viewing angle dependence. With the alignment direction of the first liquid crystal molecules 310 and the alignment direction of the second liquid crystal molecules 910 inverted from each other (specifically, inverted by 180 degrees), the viewing angle dependence is optically compensated, so that the viewing angle characteristics of the liquid crystal lens 10 can be enhanced.

Although the present modified example describes a case where the third substrate 700 faces the first liquid crystal layer 300 across the second substrate 200, the same effect can be achieved when the third substrate 700 faces the first liquid crystal layer 300 across the first substrate 100.

Although the present modified example describes a case of including, sequentially from the first liquid crystal cell 10A, the third substrate 700, the second liquid crystal layer 900, and the fourth substrate 800, the same effect can be achieved in a case of including, sequentially from the first liquid crystal cell 10A, the fourth substrate 800, the second liquid crystal layer 900, and the third substrate 700.

Modified Example 6 of Embodiment 1

Figure 23:
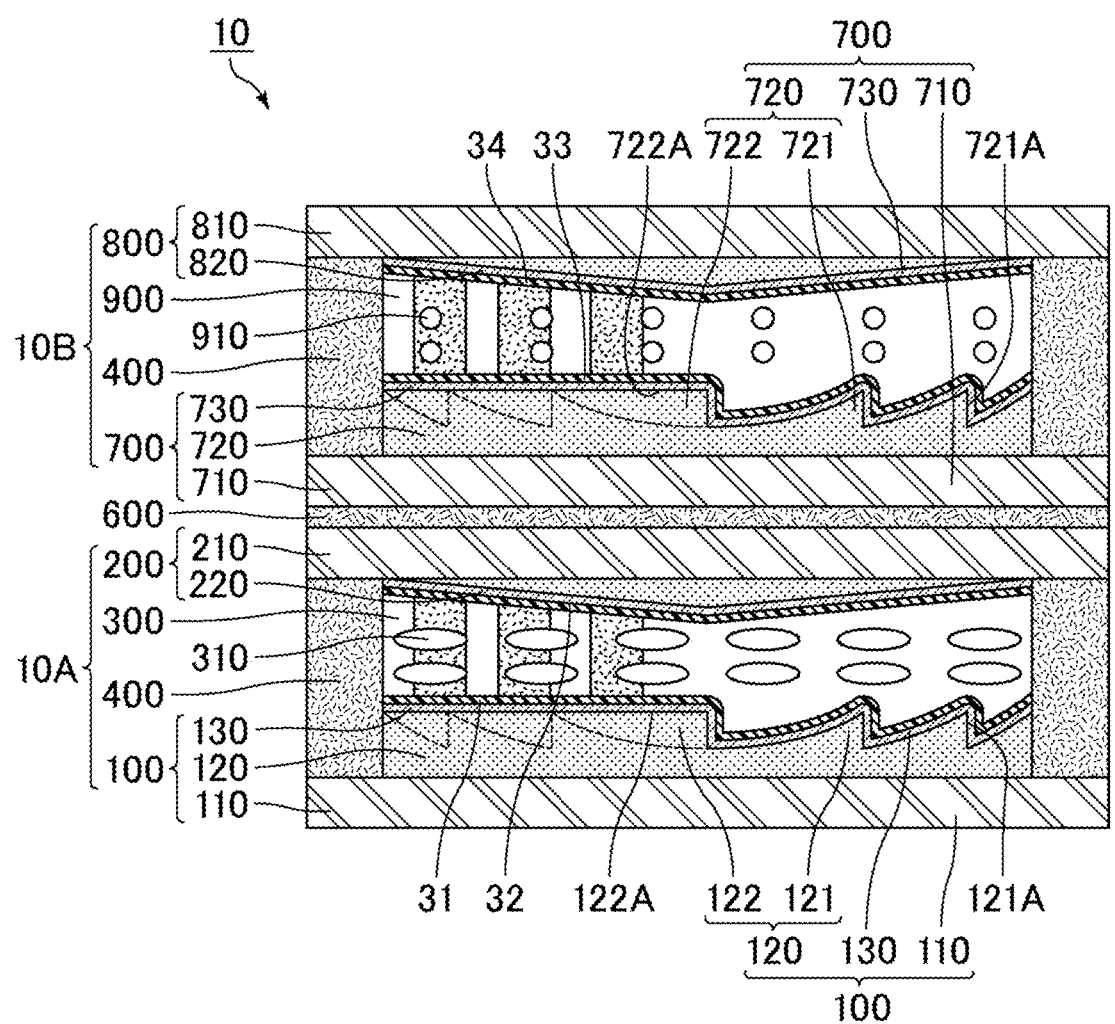
FIG. 23 is a schematic cross-sectional view of a liquid crystal lens of Modified Example 6 of Embodiment 1.

FIG. 23 is a schematic cross-sectional view of a liquid crystal lens of Modified Example 6 of Embodiment 1. In Modified Example 5 of Embodiment 1, the alignment direction of the first liquid crystal molecules 310 and the alignment direction of the second liquid crystal molecules 910 are the same as each other or inverted from each other. In the present modified example, as shown in FIG. 23, the alignment direction of the first liquid crystal molecules 310 and the alignment direction of the second liquid crystal molecules 910 are perpendicular to each other.

The liquid crystal lens 10 utilizes the difference in refractive index between the liquid crystal layer and the Fresnel lens (Fresnel resin) to refract light. Thus, when including only one liquid crystal cell, the liquid crystal lens 10 has difficulty in exerting its lens effect on linearly polarized light vibrating in the direction parallel to the alignment direction of the liquid crystal molecules. Meanwhile, as in the present modified example, when the liquid crystal lens 10 includes two liquid crystal cells 10A and 10B and the alignment direction of the first liquid crystal molecules 310 and the alignment direction of the second liquid crystal molecules 910 are perpendicular to each other, the liquid crystal lens 10 can exert its lens effect on both linearly polarized light vibrating in the direction parallel to the liquid crystal molecules and linearly polarized light vibrating in the direction perpendicular to the liquid crystal molecules. Since common unpolarized light is optically the sum of two linearly polarized lights, exerting a lens effect on two linearly polarized lights means being capable of exerting a lens effect on polarized light and unpolarized light. The liquid crystal lens 10 of the present modified example can achieve a liquid crystal lens independent of the polarization state of incident light. Herein, the expression that two linear lines (including axes, directions, and azimuths) are perpendicular to each other means that the angle (absolute value) formed by the lines is within the range of 90±3°, preferably 90±1°, more preferably 90±0.5°, particularly preferably 90° (perfectly perpendicular).

Embodiment 2

The features unique to the present embodiment are mainly described here, and description of the matters already described in Embodiment 1 is omitted. The present embodiment relates to a head mounted display including the liquid crystal lenses of Embodiment 1 as its eyepieces.

Figure 24:
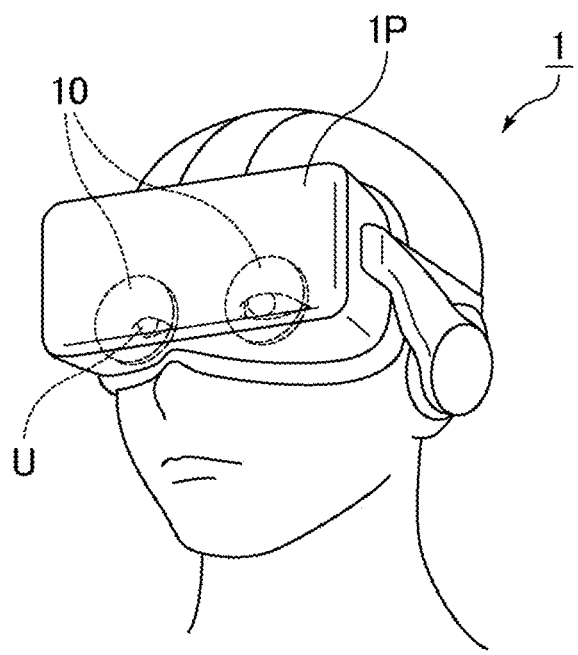
FIG. 24 is a schematic perspective view of an example of a head mounted display of Embodiment 2.

FIG. 24 is a schematic perspective view of an example of a head mounted display of Embodiment 2. A head mounted display (HMD) 1 of the present embodiment shown in FIG. 24 includes, when worn by a user U, includes a display panel 1P and the liquid crystal lenses 10 as eyepieces between the display panel 1P and the user U. The liquid crystal lenses 10 of Embodiment 1 can be used as eyepieces of an HMD as shown in FIG. 24. In this configuration, the focal length can be adjusted with the liquid crystal lenses 10. This enables adjustment of the user's vision and adjustment of the position (depth) at which an image (virtual image) is formed.

Preferably, the focal length of the liquid crystal lenses 10 is 50 mm or longer, the diameter is 40 mm or greater and 65 mm or smaller, and the height is 10 μm or higher and 30 μm or lower. The upper limit of the focal length of the liquid crystal lenses 10 is, for example, 1000 mm or shorter, though there is no upper limit for the focal length since the focal length is ∞ when the liquid crystal lenses 10 are turned off.

The display panel 1P can be one commonly used in the field of HMDs.

Embodiment 3

Figure 25:
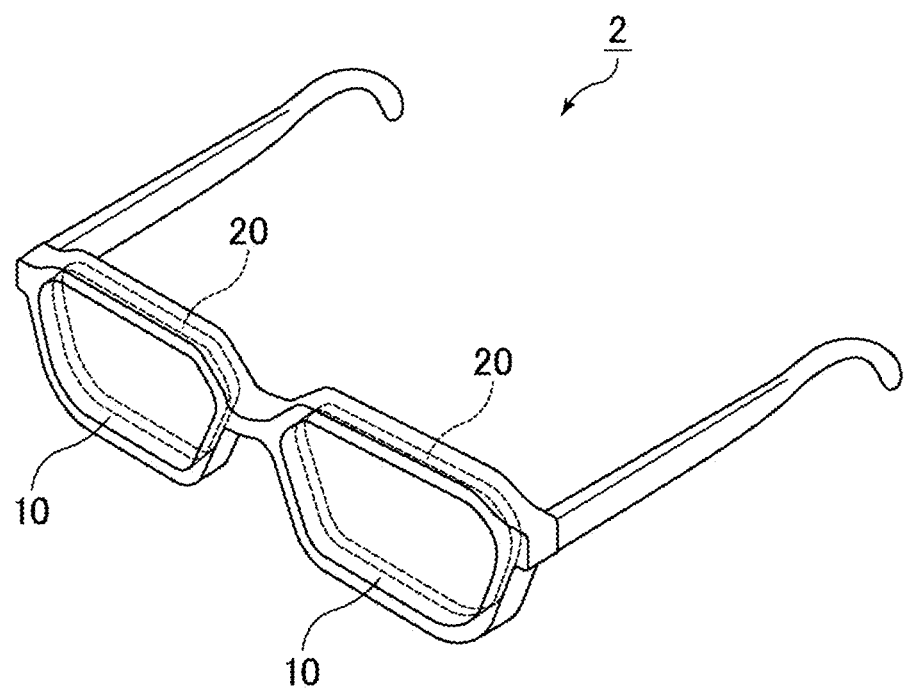
FIG. 25 is a schematic perspective view of an example of polarized sunglasses of Embodiment 3.
Figure 26:
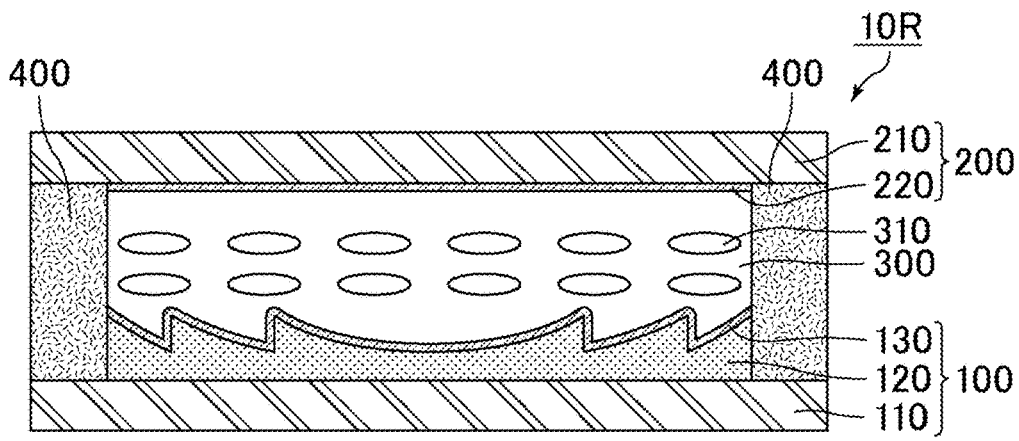
FIG. 26 is a schematic cross-sectional view of a conventional liquid crystal lens.
Figure 27:
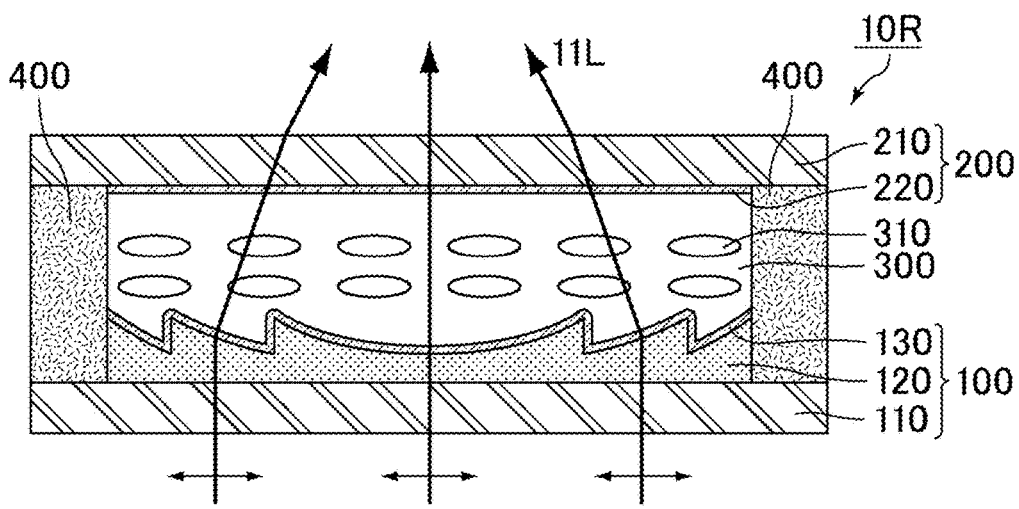
FIG. 27 is a schematic cross-sectional view of the conventional liquid crystal lens with no voltage applied.
Figure 28:
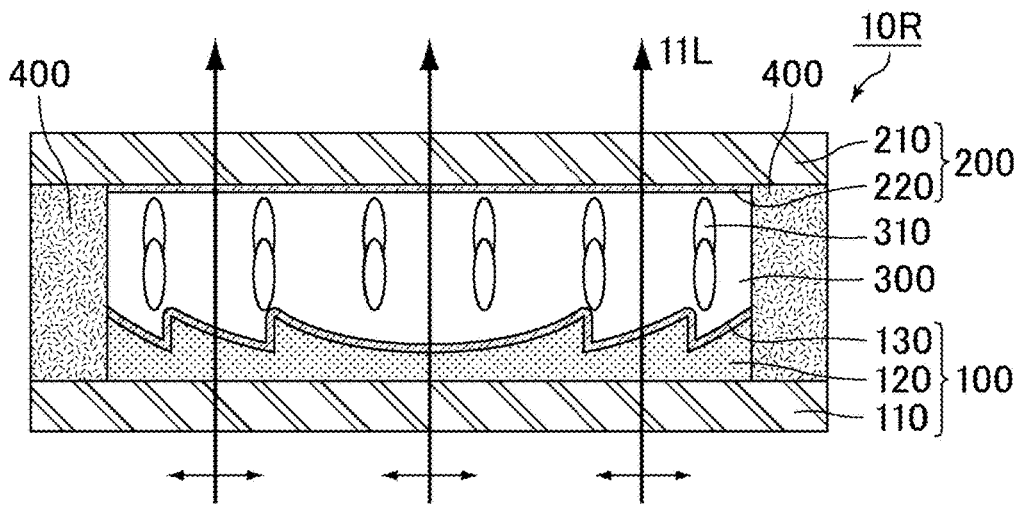
FIG. 28 is a schematic cross-sectional view of the conventional liquid crystal lens with voltage applied.

The features unique to the present embodiment are mainly described here, and description of the matters already described in Embodiment 1 is omitted. The present embodiment relates to polarized sunglasses including the liquid crystal lenses of Embodiment 1 as their lenses. FIG. 25 is a schematic perspective view of an example of polarized sunglasses of Embodiment 3. Polarized sunglasses 2 of the present embodiment shown in FIG. 25 include stacks each including the liquid crystal lens 10 of Embodiment 1 and a common lens 20. This configuration can utilize the liquid crystal lenses 10 to control light entering the eyes of a user wearing the polarized sunglasses 2.

EXAMPLES

The present invention is described in more detail based on the following examples. The present invention is not limited to these examples.

Example 1

The head mounted display of Embodiment 2 was produced which included the liquid crystal lenses 10 of Embodiment 1 as its eyepieces. The focal length of the liquid crystal lenses 10 corresponded to 8D (=125 mm), the diameter was 60 mm, and the height was 25 μm.

The liquid crystal layer 300 (liquid crystal material) had a Δn of 0.24 (no=1.5, ne=1.74) and contained the liquid crystal molecules 310 having a tolane structure.

The flat surface 122A was disposed at the same height as the vertices 121BX of the Fresnel lens 120 and extended linearly across the entire diameter of the Fresnel lens 120. The width of the flat surface 122A in a plan view was 15 μm.

The first alignment film 31 and the second alignment film 32 were horizontal alignment films each containing a polymer having a cyclic aliphatic group.

The spacers 500 were disposed on the second substrate 200. The height of the spacers 500 was 3 μm and the diameter of each spacer 500 in a plan view was 10 μm.

Example 2

The liquid crystal lens 10 of Modified Example 5 of Embodiment 1 was produced. The focal length of each of the first liquid crystal cell 10A and the second liquid crystal cell 10B of the liquid crystal lens 10 corresponded to 4D, the diameter was 60 mm, and the height was 12 μm. The first liquid crystal cell 10A and the second liquid crystal cell 10B were attached to each other with an OCA as the adhesive layer 600 such that the alignment direction of the first liquid crystal molecules 310 and the alignment direction of the second liquid crystal molecules 910 would be the same as each other.

Example 3

The liquid crystal lens 10 of Modified Example 6 of Embodiment 1 was produced. The focal length of each of the first liquid crystal cell 10A and the second liquid crystal cell 10B of the liquid crystal lens 10 corresponded to 4D, the diameter was 60 mm, and the height was 12 μm. The first liquid crystal cell 10A and the second liquid crystal cell 10B were attached to each other with an OCA as the adhesive layer 600 such that the alignment direction of the first liquid crystal molecules 310 and the alignment direction of the second liquid crystal molecules 910 would differ from each other by 90 degrees.

REFERENCE SIGNS LIST

1: head mounted display
1P: display panel
2: polarized sunglasses
10, 10R: liquid crystal lens
10A: first liquid crystal cell (first liquid crystal lens)
10B: second liquid crystal cell (second liquid crystal lens)
11L: polarized light
20: common lens
31: first alignment film
32: second alignment film
33: third alignment film
34: fourth alignment film
100: first substrate
110: first support substrate
120: Fresnel lens (first Fresnel lens)
120A, 120A1, 120A2: outermost periphery
120B: center
120C: central part
120D: edge
120U: bottom surface
120X: groove
121: Fresnel-shaped part (first Fresnel-shaped part)
121A: annular lens surfaces (first annular lens surfaces)
121AX, 121AX1, 121AX2: refractive surface
121AY: non-refractive surface
121B: uneven surface
121BX: vertex
122: flat part (first flat part)
122A: flat surface (first flat surface)
123X1, 123X2: region
130: first electrode
130A, 220A: stack
131, 221: transparent conductive film
132, 222: inorganic film
200: second substrate
210TA: liquid crystal layer-facing surface
210: second support substrate
210T: tapered portion
220: second electrode
300: liquid crystal layer (first liquid crystal layer)
310: liquid crystal molecule (first liquid crystal molecule)
400: sealant
500: spacer
600: adhesive layer
700: third substrate
710: third support substrate
720: second Fresnel lens
721: second Fresnel-shaped part
721A: second annular lens surfaces
722: second flat part
722A: second flat surface
730: third electrode
800: fourth substrate
810: fourth support substrate
820: fourth electrode
900: second liquid crystal layer
910: second liquid crystal molecule
U: user

What is claimed is:

1. A liquid crystal lens comprising:
a first substrate;
a second substrate facing the first substrate; and
a liquid crystal layer held between the first substrate and the second substrate and containing liquid crystal molecules, wherein
the first substrate includes a Fresnel lens and a first electrode sequentially toward the liquid crystal layer,
the second substrate includes a second electrode, the Fresnel lens includes a Fresnel-shaped part and a flat part, the Fresnel-shaped part including a plurality of annular lens surfaces disposed in a concentric circle pattern, the flat part including a flat surface that extends in a radial direction of the concentric circle and intersects at least one of the annular lens surfaces, the annular lens surfaces are disposed on a liquid crystal layer-facing surface of the Fresnel-shaped part and defining an uneven surface, the flat surface is disposed on a liquid crystal layer-facing surface of the flat part, and the flat surface is disposed at the same height as a vertex of the uneven surface or higher than the vertex of the uneven surface.

2. The liquid crystal lens according to claim 1, wherein the first electrode overlaps the flat surface.

3. The liquid crystal lens according to claim 1, wherein the flat surface in a plan view extends linearly from an outermost periphery of the Fresnel lens toward a center of the Fresnel lens.

4. The liquid crystal lens according to claim 1, further comprising, on a liquid crystal layer side of the Fresnel lens, an alignment maintenance layer configured to control alignment of the liquid crystal molecules.

5. The liquid crystal lens according to claim 1, wherein the Fresnel lens is provided, in a liquid crystal layer-facing surface of the Fresnel lens, with a plurality of grooves parallel to one another.

6. The liquid crystal lens according to claim 1, further comprising an alignment film between the second substrate and the liquid crystal layer,
wherein the alignment film contains a polymer having a cyclic aliphatic group.

7. The liquid crystal lens according to claim 1, wherein the liquid crystal layer has a birefringence $\Delta n$ of 0.2 or higher.

8. The liquid crystal lens according to claim 1, wherein the liquid crystal layer has a nematic-isotropic phase transition temperature of 110° C. or higher.

9. The liquid crystal lens according to claim 1, wherein the liquid crystal molecules have a tolane structure.

10. The liquid crystal lens according to claim 1, wherein the liquid crystal molecules have a positive anisotropy of dielectric constant, and
the liquid crystal molecules have an ordinary refractive index equal to a refractive index of the Fresnel lens.

11. The liquid crystal lens according to claim 1, wherein light incident on the liquid crystal lens is linearly polarized light vibrating at an azimuth parallel to an initial alignment azimuth of the liquid crystal molecules.

12. The liquid crystal lens according to claim 1, wherein at least one of the first electrode or the second electrode is a stack of a plurality of films having different refractive indices.

13. The liquid crystal lens according to claim 12, wherein the stack includes a transparent conductive film and at least one type of an inorganic film.

14. The liquid crystal lens according to claim 1, wherein the liquid crystal layer is a first liquid crystal layer, the liquid crystal molecules are first liquid crystal molecules, the Fresnel lens is a first Fresnel lens, the annular lens surfaces are first annular lens surfaces, the Fresnel-shaped part is a first Fresnel-shaped part, the concentric circle pattern is a first concentric circle pattern, the flat surface is a first flat surface, and the flat part is a first flat part, the liquid crystal lens further comprises a third substrate facing the first liquid crystal layer across the second substrate or facing the first liquid crystal layer across the first substrate;

a fourth substrate facing the third substrate; and a second liquid crystal layer held between the third substrate and the fourth substrate and containing second liquid crystal molecules, the third substrate including a second Fresnel lens and a third electrode sequentially toward the second liquid crystal layer, the fourth substrate including a fourth electrode, the second Fresnel lens including a second Fresnel-shaped part and a second flat part, the second Fresnel-shaped part including a plurality of second annular lens surfaces disposed in a second concentric circle pattern, the second flat part including a second flat surface that extends in a radial direction of the second concentric circle and intersects at least one of the second annular lens surfaces, the second annular lens surfaces disposed on a second liquid crystal layer-facing surface of the second Fresnel-shaped part and defining an uneven surface, the second flat surface disposed on a second liquid crystal layer-facing surface of the second flat part.

15. The liquid crystal lens according to claim 14, wherein an alignment direction of the first liquid crystal molecules and an alignment direction of the second liquid crystal molecules are the same as each other or inverted from each other.

16. The liquid crystal lens according to claim 14, wherein an alignment direction of the first liquid crystal molecules and an alignment direction of the second liquid crystal molecules are perpendicular to each other.

17. A head mounted display comprising
the liquid crystal lens according to claim 1.

18. Polarized sunglasses comprising
the liquid crystal lens according to claim 1.

19. A liquid crystal lens comprising:
a first substrate;
a second substrate facing the first substrate;
a liquid crystal layer held between the first substrate and the second substrate and containing liquid crystal molecules; and
the first substrate includes a Fresnel lens and a first electrode sequentially toward the liquid crystal layer,
the second substrate includes a second electrode,
the Fresnel lens includes a Fresnel-shaped part and a flat part, the Fresnel-shaped part including a plurality of annular lens surfaces disposed in a concentric circle pattern, the flat part including a flat surface that extends in a radial direction of the concentric circle and intersects at least one of the annular lens surfaces, the annular lens surfaces are disposed on a liquid crystal layer-facing surface of the Fresnel-shaped part and defining an uneven surface, the flat surface disposed on a liquid crystal layer-facing surface of the flat, and the spacer overlaps the flat surface.

20. A liquid crystal lens comprising:
a first substrate;
a second substrate facing the first substrate; and
a liquid crystal layer held between the first substrate and the second substrate and containing liquid crystal molecules, wherein the first substrate includes a Fresnel lens and a first electrode sequentially toward the liquid crystal layer, the second substrate includes a second electrode, the second substrate further includes, in a liquid crystal layer-facing surface of the second substrate, a tapered portion that is thick in its center and becomes thinner toward its periphery, the Fresnel lens includes a Fresnel-shaped part and a flat part, the Fresnel-shaped part including a plurality of annular lens surfaces disposed in a concentric circle pattern, the flat part including a flat surface that extends in a radial direction of the concentric circle and intersects at least one of the annular lens surfaces, the annular lens surfaces are disposed on a liquid crystal layer-facing surface of the Fresnel-shaped part and defining an uneven surface, and the flat surface are disposed on a liquid crystal layer-facing surface of the flat part.

21. The liquid crystal lens according to claim 20, wherein the tapered portion in a plan view is rotationally symmetric.

22. The liquid crystal lens according to claim 20, wherein the tapered portion in a plan view is symmetric about a line at an initial alignment azimuth of the liquid crystal molecules.

* * * * *